US012739470B2

(12) United States Patent
Li et al.

(10) Patent No.: US 12,739,470 B2
(45) Date of Patent: Sep. 15, 2026

(54) DISPLAY APPARATUS AND METHOD FOR DISPLAYING LIVE PROGRAM

(71) Applicant: HISENSE VISUAL TECHNOLOGY CO., LTD., Qingdao (CN)

(72) Inventors: Xudong Li, Qingdao (CN); Weijia Yan, Qingdao (CN); Peng Zhang, Qingdao (CN); Wenxiao Liu, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 19/224,569

(22) Filed: May 30, 2025

(65) Prior Publication Data

US 2025/0294212 A1 Sep. 18, 2025

Related U.S. Application Data

(63) Continuation of application No. PCT/CN2023/112902, filed on Aug. 14, 2023.

(30) Foreign Application Priority Data

Dec. 19, 2022 (CN) ......................... 202211635390.0
Dec. 19, 2022 (CN) ......................... 202211635673.5

(51) Int. Cl.
*H04N 21/443* (2011.01)
*H04N 21/2187* (2011.01)
(Continued)

(52) U.S. Cl.
CPC ..... *H04N 21/4433* (2013.01); *H04N 21/2187* (2013.01); *H04N 21/4524* (2013.01); *H04N 21/472* (2013.01)

(58) Field of Classification Search
CPC ........... H04N 21/4433; H04N 21/2187; H04N 21/4524; H04N 21/472; H04N 5/46; H04N 21/4432
See application file for complete search history.

(56) References Cited

U.S. PATENT DOCUMENTS 8,418,209 B1 4/2013 Yang et al.
2010/0205645 A1* 8/2010 Tokoshima .............. H04N 5/46 725/134

FOREIGN PATENT DOCUMENTS

CN 1780380 A 5/2006
CN 104980803 A 10/2015
(Continued)

OTHER PUBLICATIONS

The World Intellectual Property Organization (WIPO) International Search Report for PCT/CN2023/112902 Nov. 24, 2023 6 Pages.

*Primary Examiner* — Kunal Langhnoja
(74) *Attorney, Agent, or Firm* — Anova Law Group, PLLC

(57) ABSTRACT

The disclosure provides a display apparatus and a method for displaying a live program. The display apparatus is provided with a television input framework (TIF), a first television input service (TIS) and a first middleware which can support various regional standards worldwide. According to the method, a display apparatus, in response to a power-on command, turns on a second TIS and a second middleware corresponding to a first region, the second TIS is the first TIS providing the service supporting for a first standard, the second middleware is the first middleware providing the protocol supporting for the first standard, and the first standard is a standard supported in the first region; in response to a command to select the live broadcast application, obtain a live program corresponding to the first
(Continued)

standard through the second TIS and the second middleware; and display the live program.

20 Claims, 26 Drawing Sheets

(51) Int. Cl.
*H04N 21/45* (2011.01)
*H04N 21/472* (2011.01)

(56) References Cited

FOREIGN PATENT DOCUMENTS

| | | | | | |
|---|---|---|---|---|---|
| CN | 107426608 | A | | 12/2017 | |
| CN | 110913156 | A | | 3/2020 | |
| CN | 111447475 | A | | 7/2020 | |
| CN | 112804589 | A | | 5/2021 | |
| CN | 114679556 | A | | 6/2022 | |
| CN | 115396701 | A | | 11/2022 | |
| EP | 3226550 | A1 | * | 10/2017 | ......... H04N 21/4325 |
| WO | WO-2022211258 | A1 | * | 10/2022 | ........... H04N 21/485 |

* cited by examiner

FIG. 35

DISPLAY APPARATUS AND METHOD FOR DISPLAYING LIVE PROGRAM

CROSS REFERENCE TO RELATED APPLICATIONS

This application is a continuation application of PCT Application No. PCT/CN2023/112902, filed on Aug. 14, 2023, which claims priority to Chinese patent application No. 202211635673.5 filed to the China National Intellectual Property Administration on Dec. 19, 2022, and claims priority to Chinese patent application No. 202211635390.0 filed to the China National Intellectual Property Administration on Dec. 19, 2022, all of which are hereby incorporated by reference in their entirety.

TECHNICAL FIELD

The disclosure relates to the technical field of display apparatuses, and in particular, to a display apparatus and a method for displaying a live program.

BACKGROUND

Display apparatuses refer to terminal devices that can output specific display images, which can be terminal devices such as smart TVs, mobile terminals, smart advertising screens, projectors, etc. Taking a smart TV as an example, the smart TV is a television product based on Internet application technology, equipped with an open operating system and chips, and an open application platforms, which can realize two-way human-machine interaction functions, and integrate multiple functions such as audio and video, entertainment, and data to meet the diverse and personalized needs of users.

The criterion of television signals is referred to as a standard, which can be simply understood as a technical standard used to realize television images or sound signals. The standards used when broadcasting live programs vary in different regions, such as different countries or regions. Usually, a display apparatus only supports the standard of one region. If the display apparatus is moved to another region, the display apparatus will not support the standard of that region, that is, users in that region will not be able to use the display apparatus to watch live programs. As a result, users can only purchase and use a display apparatus that support the standard of a corresponding region in different regions, so as to use the corresponding display apparatuses in different regions to watch live programs, which causes users to increase additional expenses.

SUMMARY

In a first aspect, embodiments of the disclosure provide a display apparatus, including: at least one processor. The processor is configured with a television input framework (TIF), a first television input service (TIS), and a first middleware. The TIF is configured to provide an interface for a live broadcast application, the first TIS is configured to provide a service for the live broadcast application based on the TIF, standards supported by the service provided by the first TIS include all standards, and the first middleware is configured to provide a protocol for the live broadcast application, standards supported by the protocol provided by the first middleware include all the standards, and all the standards include standards supported in regions of a globe. The processor is configured to: in response to a power-on command, turn on a second TIS and a second middleware corresponding to a first region, the second TIS being the first TIS providing the service supporting for a first standard, the second middleware being the first middleware providing the protocol supporting for the first standard, and the first standard being a standard supported in the first region; in response to a command to select the live broadcast application, obtain a live program corresponding to the first standard through the second TIS and the second middleware; and control a display to show the live program.

In a second aspect, embodiments of the embodiments provide a method for displaying a live program, and the method is applied to the display apparatus described in the first aspect. The display apparatus is configured with a television input framework (TIF), a first television input service (TIS), and a first middleware. The TIF is configured to provide an interface for a live broadcast application, the first TIS is configured to provide a service for the live broadcast application based on the TIF, standards supported by the service provided by the first TIS include all standards, and the first middleware is configured to provide a protocol for the live broadcast application, standards supported by the protocol provided by the first middleware include all the standards, and all the standards include standards supported in regions of a globe. The method includes: in response to a power-on command, turning on a second TIS and a second middleware corresponding to a first region, the second TIS being the first TIS providing the service supporting for a first standard, the second middleware being the first middleware providing the protocol supporting for the first standard, and the first standard is a standard supported in the first region; in response to a command to select the live broadcast application, obtaining a live program corresponding to the first standard through the second TIS and the second middleware; and displaying the live program.

BRIEF DESCRIPTION OF FIGURES

FIG. 9 is a flowchart of determining a second TIS and a second middleware by a display apparatus according to some embodiments of the disclosure.

FIG. 10 is a flowchart of turning on a second TIS and a second middleware by a display apparatus according to some embodiments of the disclosure.

FIG. 35 is a schematic diagram of a system architecture of a display apparatus according to some embodiments of the disclosure.

DETAILED DESCRIPTION

Figure 1:
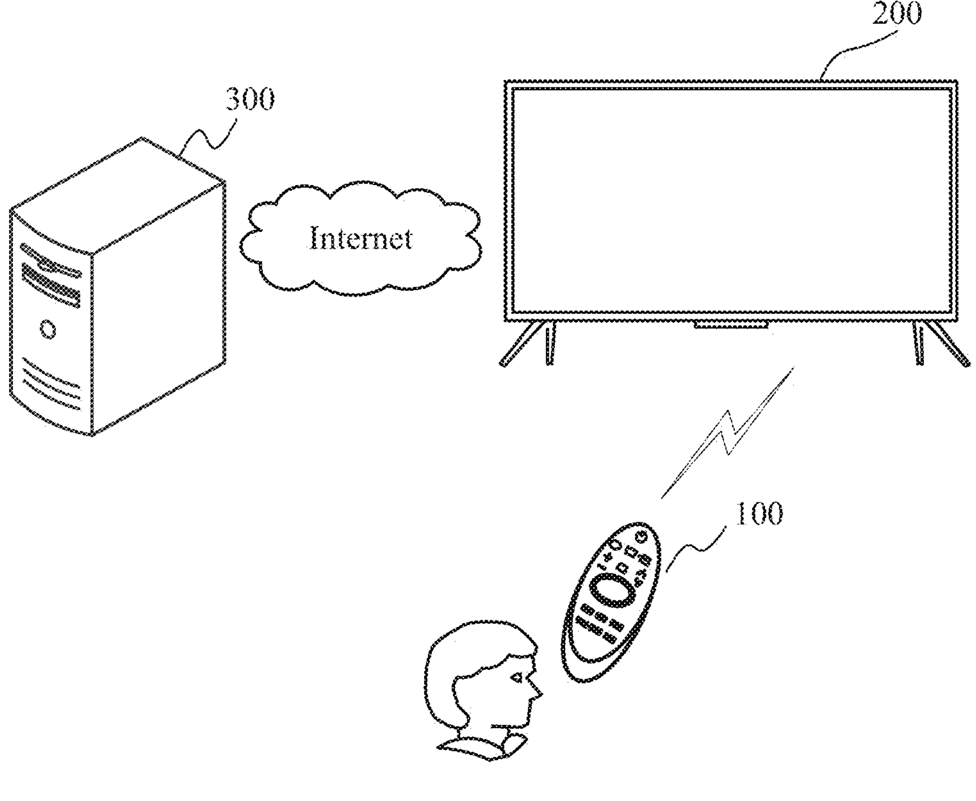
FIG. 1 is a use scenario of a display apparatus according to some embodiments of the disclosure.

Embodiments will be described in detail below, examples of which are illustrated in the drawings. When the following description refers to the drawings, the same numbers in different drawings refer to the same or similar elements, unless otherwise indicated. The implementations described in the following embodiments do not represent all implementations that are consistent with the disclosure. They are merely examples of systems and methods that are consistent with some aspects of the disclosure as detailed in the claims.

It should be noted that the brief description of terms in this disclosure is only for the convenience of understanding the embodiments described below, and is not intended to limit the embodiments of the disclosure. Unless otherwise stated, these terms should be understood according to their ordinary and usual meaning.

Terms “first”, “second”, “third”, etc. in the description and claims of the disclosure and the above drawings are used to distinguish similar or similar objects or entities, and do not necessarily mean to limit a specific order or sequence, unless otherwise noted. It should be understood that the terms used in this way can be interchangeable under appropriate circumstances.

Figure 2:
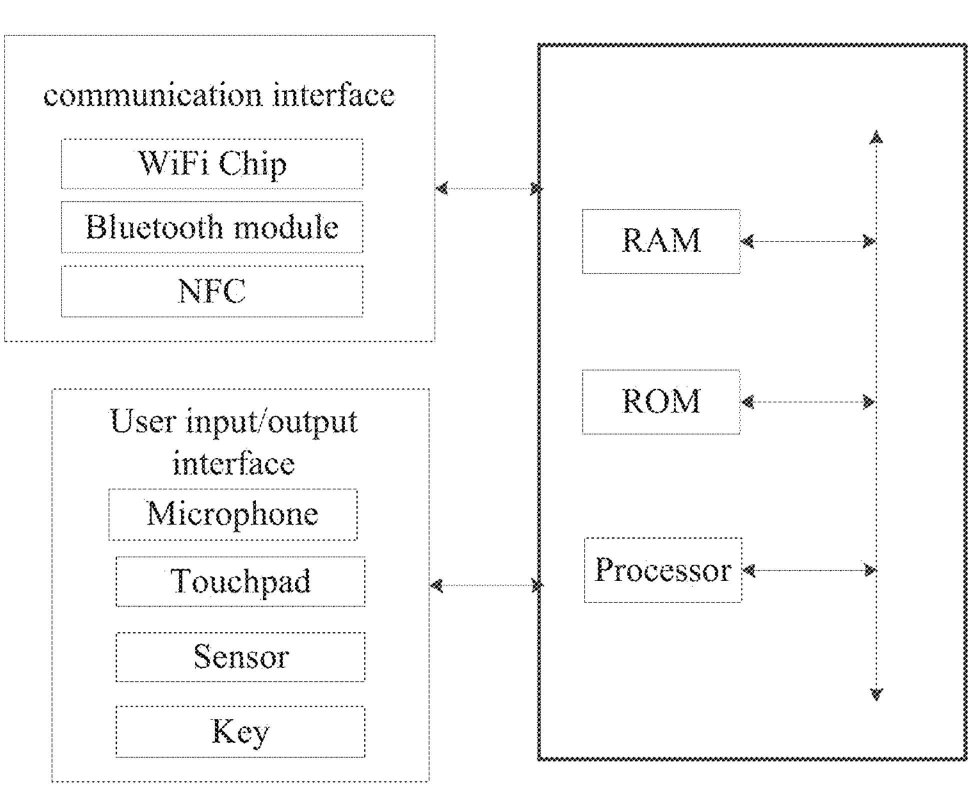
FIG. 2 is a block diagram of a configuration of a control device according to some embodiments of the disclosure.

The display apparatus provided by the embodiments of the disclosure may have a variety of implementation forms, for example, it may be a smart TV, a laser projection device, a monitor, an electronic bulletin board, an electronic table, etc., or it may be a device having a display screen, such as a mobile phone, a tablet computer, and a smart watch. FIGS. 1-2 illustrate a specific implementation of the display apparatus of the disclosure.

FIG. 1 is a schematic diagram of an operation scenario of a display apparatus according to the embodiments. As shown in FIG. 1, a user can operate the display apparatus 200 through a control device 100, the display apparatus 200 may obtain network data through a server 300, or obtain a live broadcast signal through a satellite.

FIG. 2 is a block diagram of a configuration of the control device 100. In some embodiments, the control device 100 may be a remote controller, and the communication between the remote controller and the display apparatus 200 includes at least one of an infrared protocol communication, a Bluetooth protocol communication, and other short-distance communication methods. The display apparatus 200 is controlled in a wireless or wired manner. The user may input a user command through a key on the remote controller, a voice input, a control panel input, etc., to control the display apparatus 200.

Figure 3:
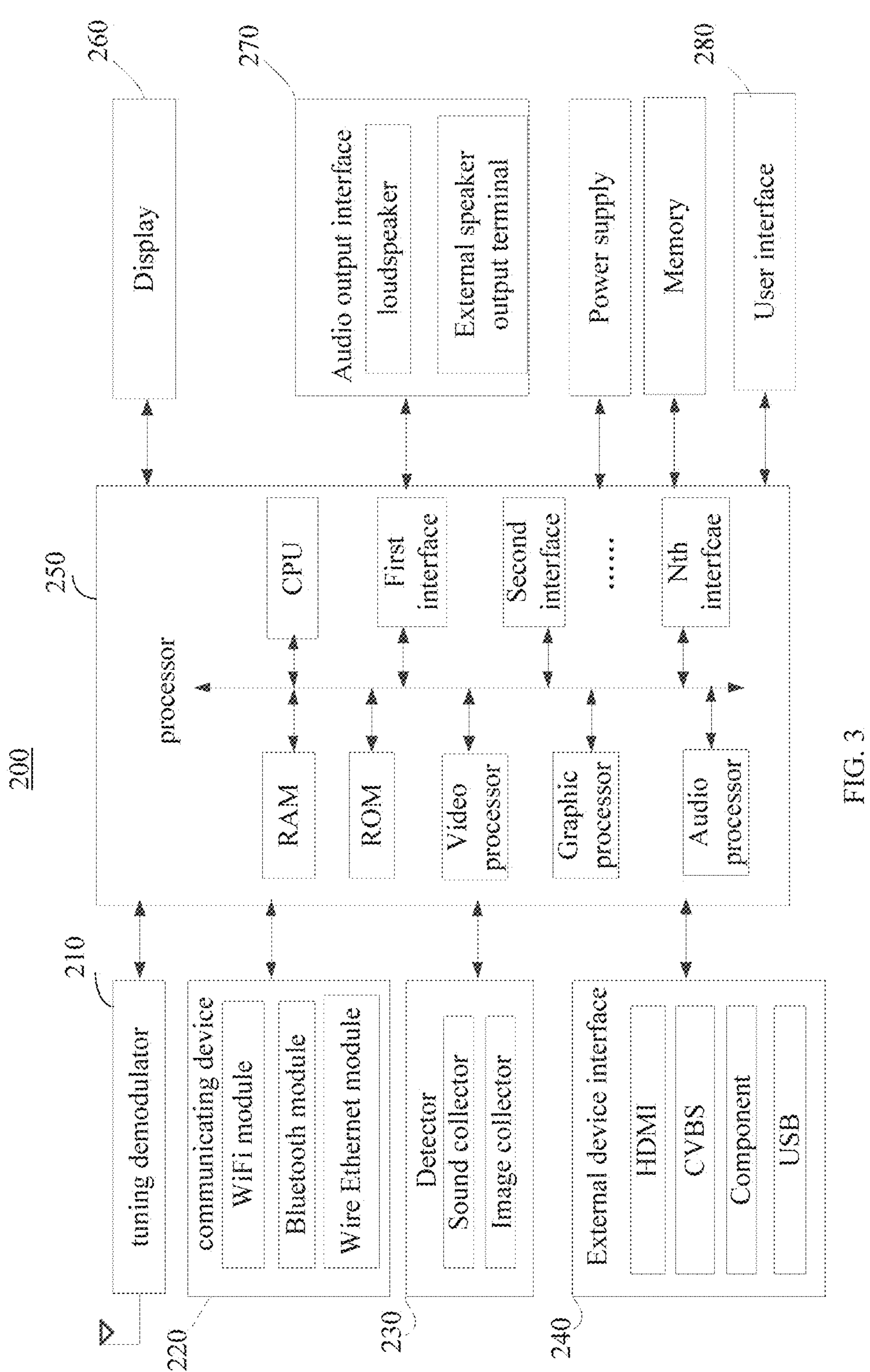
FIG. 3 is a configuration diagram of a display apparatus according to some embodiments of the disclosure.

FIG. 3 is a configuration diagram of a display apparatus 200 according to some embodiments.

T The display apparatus 200 can include at least one of a tuning demodulator 210, a communicating device 220, a detector 230, an external device interface 240, at least one processor 250, a display 260, an audio output interface 270, a memory, a power supply, and a user port 280.

In some embodiments, the display apparatus 200 can establish the transmission and reception of control signals and data signals with the control device 100 or the server 300 through the communicating device 220. In some embodiments, the processor 250 and the tuning demodulator 210 may be located in different separate devices, that is, the tuning demodulator 210 may also be located in an external device of the main device where the processor 250 is located, such as an external set-top box, etc.

In some embodiments, the processor 250 controls the operation of the display apparatus and responds to the user's operation through various software control programs stored in the memory. The processor 250 controls the overall operation of the display apparatus 200. In some embodiments, the processor 250 may include at least one of a Central Processing Unit (CPU), a video processor, an audio processor, a Graphics Processing Unit (GPU), a Random Access Memory (RAM), a Read-Only Memory (ROM), a first interface to an nth interface for input/output, and a communication bus (Bus), etc. In some embodiments, the display 260 includes a display screen component for presenting a picture, and a driving component for driving image display, for receiving an image signal output from the processor 250, and for displaying video content, image content, and a component of a menu control interface and a user control UI interface. In some embodiments, the display 260 may be a liquid crystal display, an OLED display, or a projection display, or can also be a projection device and a projection screen. In some embodiments, a user can input a user command in a graphical user interface (GUI) displayed on the display 260, and then the user input interface receives the user input command through the graphical user interface (GUI). Alternatively, the user can input a user command by inputting a specific sound or gesture, and the user input interface recognizes the sound or gesture through a sensor to receive the user input command. In some embodiments, the "user interface" is a medium interface for interaction and information exchange between an application or an operating system and a user, which realizes the conversion between an internal form of information and a form acceptable to the user. The commonly used form of the user interface is a graphical user interface (GUI), which refers to a user interface related to computer operation displayed in a graphical manner. It can be an interface element such as an icon, a window, a control, etc. displayed on the display screen of an electronic device, herein the control may include at least one of visual interface elements such as an icon, a button, a menu, a tab, a text box, a dialog box, a status bar, a navigation bar, a widget, etc.

Figure 4:
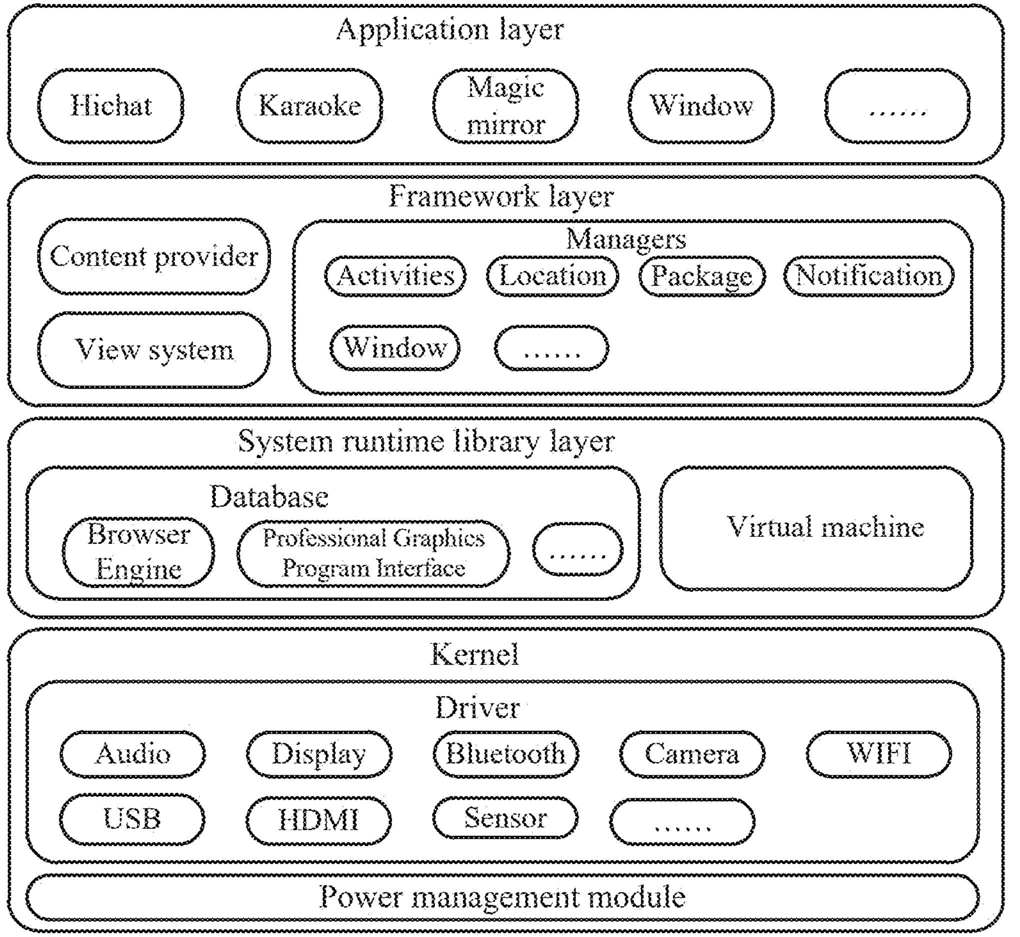
FIG. 4 is a configuration diagram of an operating system of a display apparatus according to some embodiments of the disclosure.

Referring to FIG. 4, in some embodiments, the operating system of the display apparatus 200 is divided into four layers, From top to bottom, they are an applications layer (referred to as "Application layer"), an application framework layer (referred to as "Framework Layer"), an android runtime and system library layer (referred to as "system runtime library layer"), and a kernel layer. In some embodiments, at least one application runs in the applications layer. These applications can be a window program, a system setting program or a clock program that comes with the operating system, such as a live broadcast application, which is used to play a live program; or they can also be applications developed by a third-party developer.

The criterion of television signals is referred to as a standard, which can be simply understood as a technical standard used to realize television images or sound signals. For example, the three major digital television (Digital Television, DTV) standards globally include: Advanced Standard Committee (ATSC), Digital Video Broadcasting (DVB), and Integrated Services Digital Broadcasting (ISDB). For another example, the three major analog television (ATV) standards globally include: Phase Alteration Line (PAL), National Television Standards Committee (NTSC), and Sequential Couleur A Memoire (SECAM). The combination of DTV standard and ATV standard is usually: DVB+PAL, ATSC+NTSC, ISDB+SECAM.

Different regions use different standards for live broadcasting, and regions can be divided by country or region. For example, region A supports broadcasting live programs in DVB+PAL, region B supports broadcasting live programs in ATSC+NTSC, and region C supports broadcasting live programs in ISDB+SECAM.

Usually, a display apparatus 200 only supports the standard of one region. Therefore, the display apparatus 200 can only play live programs of the standard it supports, that is, the display apparatus 200 can only play live programs in the region it supports. If the display apparatus 200 is moved to another region, the display apparatus 200 will not be able to support the standard of this region, that is, the user in this region will not be able to use the display apparatus to watch live programs. As a result, users can only purchase and use a display apparatus that support the standard of a corresponding region in different regions, so as to use a corresponding display apparatus in different regions to watch live programs, which causes users to increase additional expenses. If a region is covered by multiple standards, or is adjacent to different standards, that is, one region supports multiple standards at the same time, if the user wants to watch the live programs of the multiple standards in the region, it is also necessary to purchase multiple display apparatuses 200 that support each standard separately, which causes users to increase additional expenses.

In order to solve the above problems, the embodiments of the disclosure provide a display apparatus, and the display apparatus may be an improvement of the display apparatus 200 or other display apparatuses shown in FIG. 1, FIG. 3 or FIG. 4. Taking the display apparatus 200 shown in FIG. 1, FIG. 3 or FIG. 4 as an example, the display apparatus 200 is configured with a television input framework TIF, a first television input service TIS and a first middleware.

Figure 5:
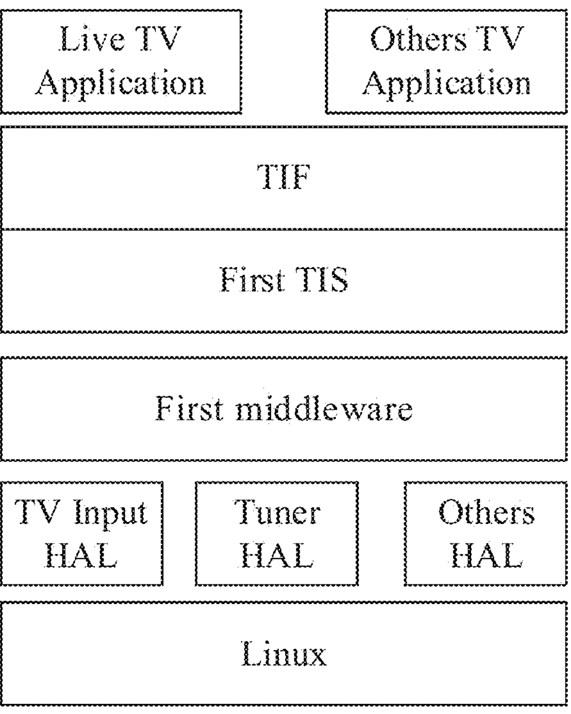
FIG. 5 is a schematic diagram of a system architecture of a display apparatus according to some embodiments of the disclosure.

The system architecture of the display apparatus 200 for playing live programs is explained in conjunction with the system architecture shown in FIG. 5, and the system architecture shown in FIG. 5 is related to the live broadcast application involved in FIG. 4. Taking the display apparatus 200 as a TV as an example, as shown in FIG. 5, the system architecture includes live broadcast applications, such as a Live TV Application and other TV applications, arranged in the application layer, a TIF arranged in the framework layer, a first TIS and a first middleware arranged in in the system runtime library layer, a hardware abstraction layer (HAL) and Linux, such as, a TV input source (TV Input) HAL, a Tuner HAL, or other HAL, arranged in the kernel layer.

TIF is an input framework based on the Android operating system. The TIF provides a standard application programming interface (API) for manufacturers to create input modules that can control Android TV and can search for and recommend live programs through metadata published by TV input sources. In other words, TIF provides an interface for live broadcast applications and can search for and recommend live programs through metadata published by TV Input HAL.

The first TIS is configured to provide a service, which is a service process implemented based on the TIF to implement specific functions of the TIF. The service provided by the first TIS corresponds to a standard, that is, the service provided by the first TIS can implement the functions of a TIF corresponding to the standard supported by the service. For example, if the service provided by the first TIS supports the DVB standard, the functions of a TIF corresponding to the DVB standard can be implemented through the service provided by the TIS.

In the embodiments of the disclosure, the standards supported by the service provided by the first TIS include all standards, and the all standards include standards supported in regions of a globe, that is, the service provided by the first TIS can support watching live programs in regions of a globe.

The first middleware is configured to provide a protocol, which is a protocol used in conjunction with the first TIS to implement the specific functions of TIF. The protocol provided by the first middleware corresponds to the standard, that is, the TIF function corresponding to the standard supported by the protocol can be implemented through cooperation between with the first TIS corresponding to the standard supported by the protocol and the protocol provided by the first middleware. For example, if the protocol provided by the middleware supports a PAL standard, the TIF function corresponding to the PAL standard can be implemented through the cooperation between the first TIS supporting the PAL standard and the middleware.

In the embodiments of the disclosure, the standards supported by the protocol provided by the first middleware include all standards, and the all standards include standards supported in regions of a globe, that is, the protocol provided by the first middleware can support watching live programs in regions of a globe.

TV Input HAL can be used to search and recommend live programs in the standards supported by the TIS and the middleware based on metadata.

Figure 6:
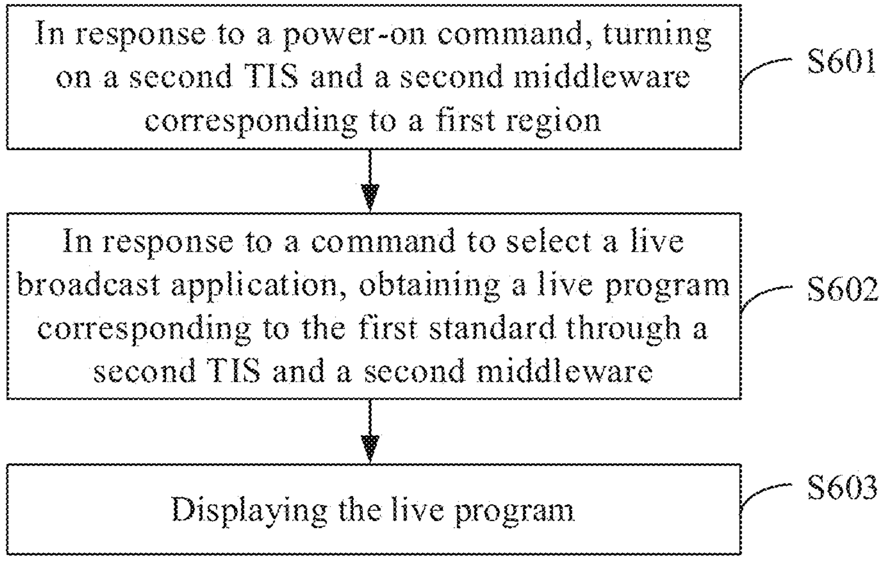
FIG. 6 is a flowchart of displaying a live program by a display apparatus according to some embodiments of the disclosure.

Based on a display apparatus 200 including the system architecture shown in FIG. 5, the embodiments of the disclosure further provides a method for displaying a live program. According to the method, the display apparatus 200 can display a live program using a standard that matches a specified region, so that users can watch live programs in any region of the globe through the same display apparatus 200. The display apparatus 200 can display live programs according to the process shown in FIG. 6, and the specific steps are as follow.

S601, In response to a power-on command, turning on a second TIS and a second middleware corresponding to a first region.

The power-on command may be a command input from a user through a power button on the display apparatus 200, or may be a command input from the user through a power button or a standby button on the control device 100.

The first region refers to a region where the live program will be played using a corresponding standard. The first region can be the region setup by the user during a boot navigation process. The first region can be any region in the world.

The standard supported by the first region is the first standard.

The second TIS belongs to the first TIS, and a service provided by the second TIS supports the first standard.

The second middleware belongs to the first middleware, and a protocol provided by the second middleware supports the first standard.

Turning on the second TIS and the second middleware refers to powering on and starting the second TIS and the second middleware, that is, creating and launching a corresponding process for the second TIS and the second middleware, providing a service through the second TIS, and providing a protocol through the second middleware.

For different first regions, if first standards corresponding to the first regions are different, different second TISs and different second middlewares can be turned on. Since the standards supported by the service provided by the first TIS include the standards corresponding to various regions around the world, the standards supported by the protocol provided by the first middleware include the standards corresponding to various regions around the world. Therefore, globally, the display apparatus 200 can determine a corresponding second TIS and a corresponding second middleware for each region, that is, one display apparatus 200 can provide services and protocols of corresponding standards for regions of a globe.

Figure 7:
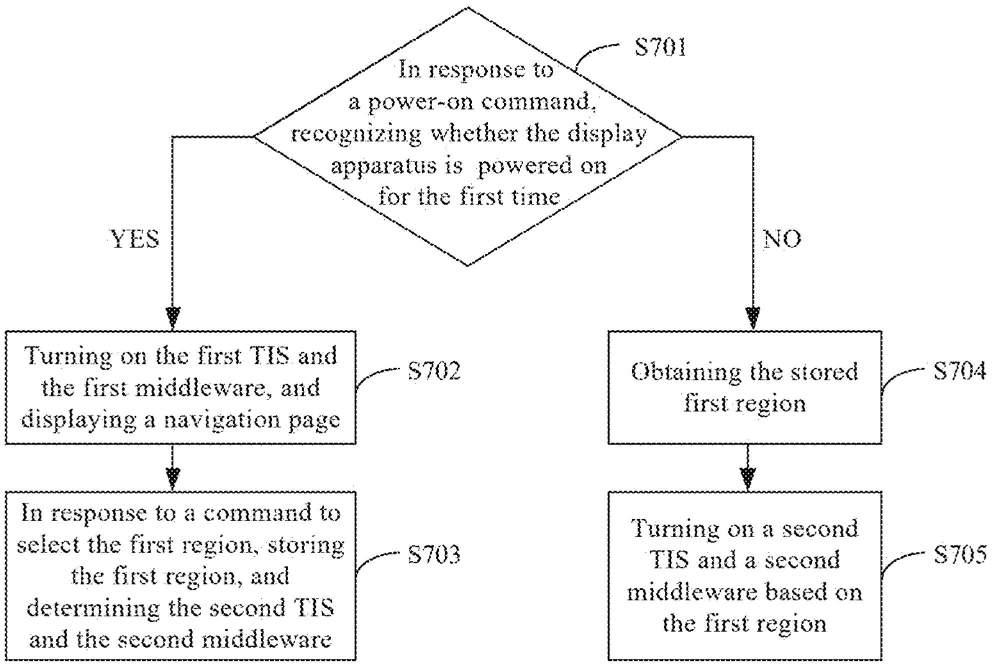
FIG. 7 is a flowchart of turning on a second TIS and a second middleware by a display apparatus according to some embodiments of the disclosure.

In some embodiments, the display apparatus 200 may turn on the second TIS and the second middleware according to the process shown in FIG. 7, and the specific steps are as follows.

S701, In response to a power-on command, recognizing whether the display apparatus is powered on for the first time.

Powering on for the first time refers to a power-on process in which the user needs to perform initial settings on relevant information of the display apparatus 200. The powering on for the first time may be a first boot after the display apparatus 200 leaves the factory, or a first boot after the display apparatus 200 is restored to factory settings. The relevant information of the display apparatus 200 may include: language, region, network, account, etc.

S702, Based on that the display apparatus is powered on for the first time, turning on the first TIS and the first middleware, and displaying a navigation page.

If the display apparatus 200 recognizes that it is powered on for the first time, the display apparatus 200 turns on all the first TISs and all the first middlewares.

The display apparatus 200 also displays a navigation page, which is used to guide the user to set relevant information of the display apparatus 200.

The navigation page includes a region list, which includes regions of a globe. Based on the region list, the user can select a first region, that is, a region where the display apparatus 200 is used.

Figure 8:
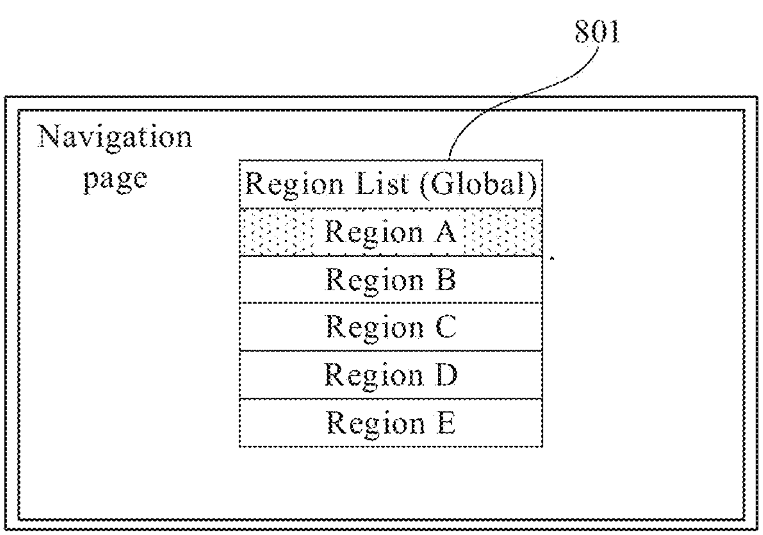
FIG. 8 is a schematic diagram of a list of regions according to some embodiments of the disclosure.

Referring to the navigation page shown in FIG. 8, the navigation page includes a region list 801, the region list 801 includes regions of a globe, and the region list 801 may be in the form of a scrolling list or a page turning list, etc. As shown in FIG. 8, the regions currently displayed in the region list 801 include region A, region B, region C, region D, and region E. The user may instruct the display apparatus 200 to scroll or turn the page of the region list 801 to cause the display apparatus 200 to display other regions until the user finds the first region to be used.

The navigation page may also include a language list, which includes languages around the world. The user may select a language to be used when using the display apparatus 200 based on the language list.

The navigation page may also include other navigation information corresponding to the relevant information to be set, such as a network setting list, an account setting list, etc.

S703, In response to a command to select the first region, storing the first region, and determining the second TIS and the second middleware.

The user sets the first region based on the region list in the navigation page.

Taking the region list 801 shown in FIG. 8 and the first region to be used by the user is region A as an example. After region A is found, the user can move a focus (shown with a gray background) to an option of region A by manipulating the control device 100 and select region A to send a command to select the first region to the display apparatus 200.

After receiving the command to select the first region, the display apparatus 200 stores the first region in response to the command, so as to use the first region as the region where the display apparatus 200 is located when using the display apparatus 200. The standard used by the display apparatus 200 when displaying the live program is determined based on the first region, that is, it determines that the display apparatus 200 uses a first standard to play the live program.

In response to the command, the display apparatus 200 further determines the second TIS and the second middleware. That is, the display apparatus 200 determines the second TIS and the second middleware which may support the first standard to prepare for the subsequent broadcast of the live program.

The display apparatus 200 may determine the second TIS and the second middleware according to the process shown in FIG. 9, and the specific steps are as follows.

S901, Obtaining a first correspondence relationship and a second correspondence relationship that are pre-stored.

The first correspondence relationship includes a correspondence relationship between each region in all regions and a standard supported by the region. The first correspondence relationship can be stored in the form of a mapping relationship list, a key-value combination, etc. For example, if the standard supported in region A is DVB+PAL, the first correspondence relationship can be stored as "region A-DVB+PAL".

The second correspondence relationship includes a correspondence relationship among the first TIS, the first middleware and the standard. The second correspondence relationship can be stored in the form of a mapping relationship list, a key-value combination, etc. Taking the first TIS including the DVB TIS, the standard supported by the DVB TIS being DVB, the first TIS including the PAL TIS, the standard supported by the PAL TIS being PAL, the first middleware including the DVB middleware, the standard supported by the first middleware being DVB, and the first middleware including the PAL middleware, and the standard supported by the first middleware being PAL as an example. The second correspondence relationship can be stored as "DVB TIS-DVB", "PAL TIS-PAL", "DVB middleware-DVB", and "PAL middleware-PAL".

S902, Determining a second TIS and a second middleware corresponding to the first region based on the first correspondence relationship and the second correspondence relationship.

Continuing with the above example, the display apparatus 200 can determine the first standard corresponding to the first region according to the first correspondence relationship. For example, the first region is region A, and according to the first correspondence relationship "region A-DVB+PAL", it can be determined that the first standard is DVB+PAL.

The display apparatus 200 can determine the second TIS and the second middleware corresponding to the first standard according to the second correspondence relationship. For example, if the first standard is DVB+PAL, according to the second correspondence relationship "DVB TIS-DVB", "PAL TIS-PAL", "DVB middleware-DV", and "PAL middleware-PAL", it can be determined that the second TIS includes DVB TIS and PAL TIS, and the second middleware includes a DVB middleware and a PAL middleware.

Since the display apparatus 200 is in a process of being powered on for the first time, before the user sets the first region, the display apparatus 200 has not determined the first region, and thus supports the first region arbitrarily set by the user by turning on all the first TISs and the first middlewares. In this way, no matter which region the user indicates as the first region, the display apparatus 200 has already turned on the second TIS and the second middleware corresponding to this region in advance, that is, a preparation work for turning on the second TIS and the second middleware required for displaying the live program has been completed in advance. Even if the user directly chooses to enter the live broadcast application after setting the first region, the display apparatus 200 can immediately use the second TIS and the second middleware that have been turned on to display the live program, so as to effectively shorten the waiting time for displaying the live program.

In some embodiments, after the first region is specified, if all the first TISs and the first middlewares are still running, more memory consumption and resource occupation will be caused, thereby affecting the overall fluency of the display apparatus 200. In order to solve the above problem, after determining the second TIS and the second middleware by the display apparatus 200, the method further includes: turning off a third TIS and a third middleware.

The third TIS is a first TIS other than the second TIS in the first TISs, that is, a first TIS that does not support the first standard, and also a first TIS that is not used when the display apparatus 200 displays a live program in the first region.

The third middleware is a first middleware other than the second middleware in the first middlewares, that is, the first middleware that does not support the first standard, that is, the first middleware that will not be used when the display apparatus 200 displays a live program in the first region.

Taking the first TIS including: DVB TIS, PAL TIS, and ATSC TIS supporting ATSC, and NTSC TIS supporting NTSC, and the first middleware including: DVB middleware, PAL middleware, and ATSC middleware supporting ATSC, and NTSC middleware supporting NTSC as an example. If the first region is region A, the second TIS includes DVB TIS and PAL TIS, and the second middleware includes DVB middleware and PAL middleware. Correspondingly, the third TIS includes ATSC TIS and NTSC TIS, and the third middleware includes ATSC middleware and NTSC middleware. The display apparatus 200 can turn off ATSC TIS and NTSC TIS, as well as ATSC middleware and NTSC middleware, keep DVB TIS and PAL TIS, as well as DVB middleware and PAL middleware being turned on to ensure that the first standard can be used to display live programs, reducing the memory consumption and resource occupation of the third TIS and the third middleware.

S704, Based on that the display apparatus is not powered on for the first time, obtaining the stored first region.

If the display apparatus 200 recognizes that it is not being powered on for the first time, it means that the display apparatus 200 has already stored the first region, and the display apparatus 200 can directly obtain and use the first region.

When the display apparatus 200 recognizes that it is not being powered on for the first time and before the stored first region is acquired, any first TIS and first middleware are not started.

S705, Turning on a second TIS and a second middleware based on the first region.

The second TIS and the second middleware corresponding to the first region are turned on by the display apparatus 200 only after determining the first region, and other first TISs and other first middleware are not turned on. The process of turning on the second TIS and the second middleware is highly targeted and can avoid consuming additional resources and memory to turn on the first TIS and the first middleware that do not correspond to the first region.

The display apparatus 200 may turn on the second TIS and the second middleware according to the process shown in FIG. 10, and the specific steps are as follows.

S1001, Obtaining a first correspondence relationship and a second correspondence relationship that are pre-stored.

The first correspondence relationship includes a correspondence relationship between each region in all regions and a standard supported by the region. The second correspondence relationship includes a correspondence relationship among the first TIS, the first middleware and the standard.

Taking the standard supported in region A as DVB+PAL as an example, the first correspondence relationship may be stored as “region A-DVB+PAL”.

Taking the first TIS including DVB TIS, the standard supported by DVB TIS being DVB, the first TIS including PAL TIS, the standard supported by PAL TIS being PAL, the first middleware including DVB middleware, the standard supported by the first middleware being DVB, and the first middleware including PAL middleware, the standard supported by the first middleware being PAL as an example. The second correspondence may be stored as “DVB TIS-DVB”, “PAL TIS-PAL”, “DVB middleware-DVB”, and “PAL middleware-PAL”.

S1002, Determining a second TIS and a second middleware corresponding to the first region based on the first correspondence relationship and the second correspondence relationship.

Continuing with the above example, the display apparatus 200 can determine the first standard corresponding to the first region according to the first correspondence relationship. For example, the first region is region A, and according to the first correspondence relationship “region A-DVB+PAL”, it can be determined that the first standard is DVB+PAL.

The display apparatus 200 can determine the second TIS and the second middleware corresponding to the first standard according to the second correspondence relationship. For example, if the first standard is DVB+PAL, according to the second correspondence relationship “DVB TIS-DVB”, “PAL TIS-PAL”, “DVB middleware-DVB”, “PAL middleware-PAL”, it can be determined that the second TIS includes DVB TIS and PAL TIS, and the second middleware includes DVB middleware and PAL middleware.

S1003, Turning on the second TIS and the second middleware.

The display apparatus 200 currently does not turn on any first TIS and first middleware. After determining the second TIS and the second middleware, only the second TIS and the second middleware are turned on by the display apparatus 200.

Taking the first TIS including: DVB TIS, PAL TIS, and ATSC TIS supporting ATSC, and NTSC TIS supporting NTSC, and the first middleware including: DVB middleware, PAL middleware, and ATSC middleware supporting ATSC, and NTSC middleware supporting NTSC as an example. If the first region is region A, the second TIS includes DVB TIS and PAL TIS, and the second middleware includes DVB middleware and PAL middleware. Correspondingly, only DVB TIS and PAL TIS, as well as DVB middleware and PAL middleware are turned on. ATSC TIS and NTSC TIS, as well as ATSC middleware and NTSC middleware are not turned on. In this way, while ensuring that the first standard can be used to display live programs, the memory consumption and resource occupation of the unnecessary first TIS and first middleware are reduced.

S602, In response to a command to select a live broadcast application, obtaining a live program corresponding to the first standard through a second TIS and a second middleware.

After the display apparatus 200 turns on the second TIS and the second middleware, it prepares to play the live program using the first standard.

If the display apparatus 200 receives a command input from the user to select a live broadcast application, in response to the command, the display apparatus 200 will obtain a live program corresponding to the first standard through the second TIS and the second middleware. That is, the display apparatus 200 will search for live programs of the first standard.

S603, Displaying the live program.

After the live program of the first standard is searched, the display apparatus 200 displays the live program for the user to watch.

The first TIS and the first middleware may be configured differently as follows.

In some embodiments, a first TIS can be merged with corresponding first middleware, that is, the first TIS and the corresponding first middleware are run in the same process. The correspondence between the first TIS and the first middleware means that a standard supported by a service provided by the first TIS matches a standard supported by a protocol provided by the first middleware. Thus, the first TIS can provide a better Android environment for the first middleware, the communication efficiency between the first TIS and the first middleware is higher, and a better effect is achieved in the view display.

In some embodiments, the first TIS can be separated from the corresponding first middleware, that is, the first TIS and the corresponding first middleware are respectively run in different processes. The correspondence between the first TIS and the first middleware means that the standard supported by the service provided by the first TIS matches the standard supported by the protocol provided by the first middleware. Thus, the first TIS is managed in a lightweight manner, and the main processing process can be dispersed in the first middleware.

In some embodiments, the quantity of first TISs may be N, where N is a positive integer greater than 1. A service provided by each first TIS support one standard, and the services provided by different first TISs support different standards. The standards supported by the N services provided by the N first TISs include all standards. Thus, each first TIS can be managed in a lightweight manner, and each first TIS can process the content of the corresponding standard in a targeted manner, with high processing efficiency.

In some embodiments, the quantity of the first TIS may be one, and services supporting all standards are provided by the first TIS. Although the memory occupied by the first TIS is relatively large, the overall operation effect of the first TIS is better than that of the sum of each of the N first TISs running separately.

In some embodiments, the quantity of first middlewares may be N, where N is a positive integer greater than 1. The protocol provided by each first middleware supports one standard, and the standards supported by the protocols provided by different first middleware are different. The standards supported by the N protocols provided by the N first middlewares include all standards. Thus, each first middleware can process the content of the corresponding standard in a targeted manner, and the processing efficiency is higher.

In some embodiments, the quantity of first middlewares can be one, and protocols supporting all standards are provided by the first middleware. Therefore, although the first middleware occupies relatively more memory, the overall effect of the operation is better than the overall effect of the sum of each of the N first middlewares running separately, and it is more convenient to switch standards.

In combination with the following embodiments, taking the standards supported by services provided by the first TIS including DVB, PAL, ATSC, NTSC, ISDB, SECAM, and the standards supported by protocols provided by the first middleware including DVB, PAL, ATSC, NTSC, ISDB, SECAM as an example (the standards supported by the first TIS and the first middleware are not limited to the above cases), the process of displaying live programs using the above-mentioned display apparatus 200 for the first TIS and the first middleware with different configurations is explained.

Embodiment 1

The TIF includes N first TISs and N first middlewares, and a first TIS and a corresponding first middleware respectively run in different processes. Each first TIS provides a service supporting a standard, and the services provided by the first TISs support different standards. Each first middleware provides a protocol supporting a standard, and the protocols provided by the first middlewares support different standards.

Figure 11:
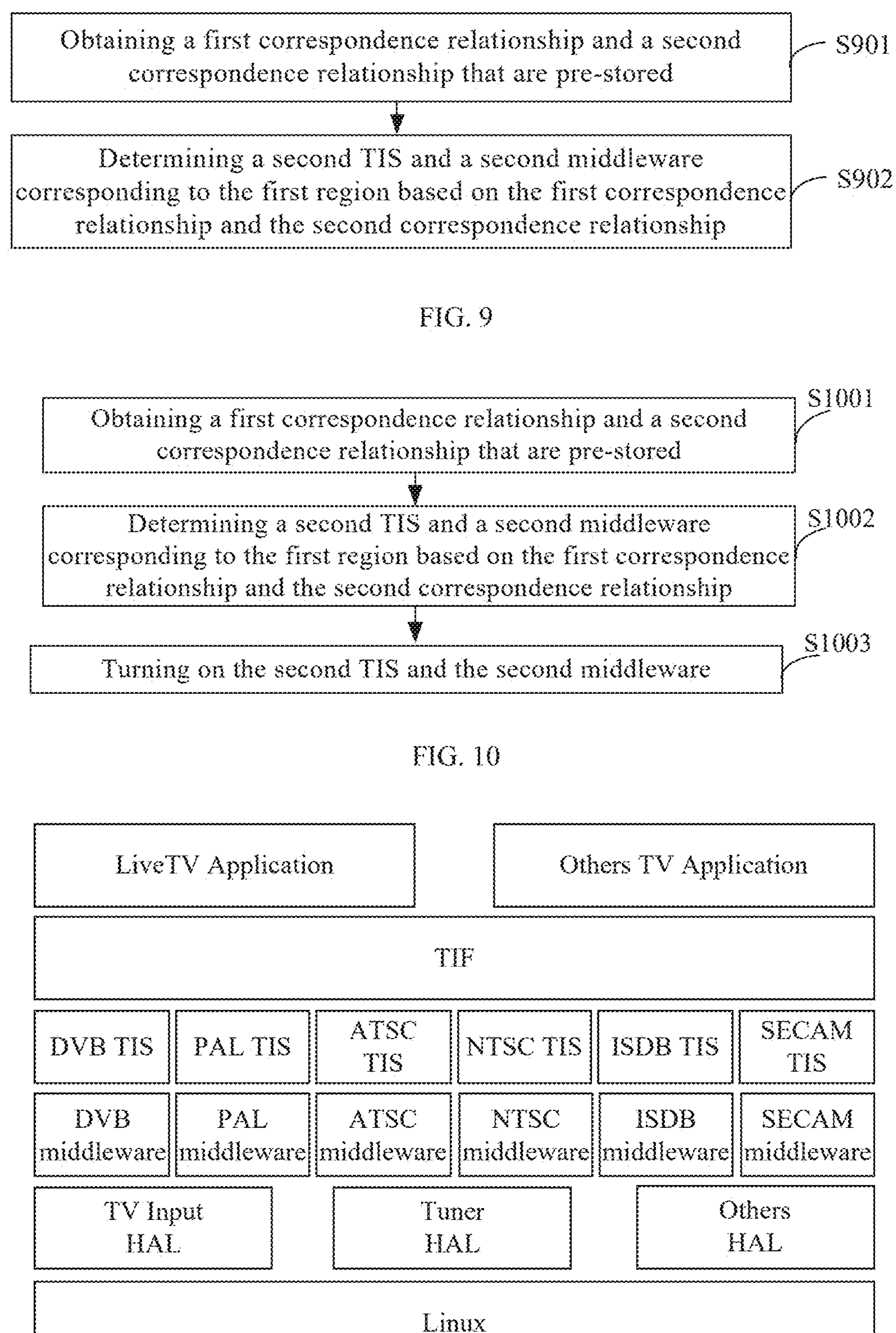
FIG. 11 is a schematic diagram of a system architecture of a display apparatus according to some embodiments of the disclosure.

Referring to a system architecture shown in FIG. 11, the system architecture includes six first TISs, namely, DVB TIS, PAL TIS, ATSC TIS, NTSC TIS, ISDB TIS, and SECAM TIS. The system architecture also includes six first middlewares, namely, DVB middleware, PAL middleware, ATSC middleware, NTSC middleware, ISDB middleware, and SECAM middleware. The first TIS and the corresponding first middleware run in different processes, respectively. Taking DVB TIS and DVB middleware as an example, DVB TIS and DVB middleware run in different processes, respectively.

Therefore, each first TIS is managed in a lightweight manner, and the main processing is dispersed in each first middleware. Each first TIS and each first middleware has a single-standard process, that is, each first TIS and each first middleware only processes the content of the standard they support, which can maintain less memory consumption and has great advantages in memory. In addition, the processing efficiency and speed are fast, the whole machine can maintain a high level of smoothness, and perform well in user response.

Taking the first region as region A, and region A supporting the first standard DVB+PAL as an example, the process of the display apparatus 200 displaying a live program is described.

Figure 12:
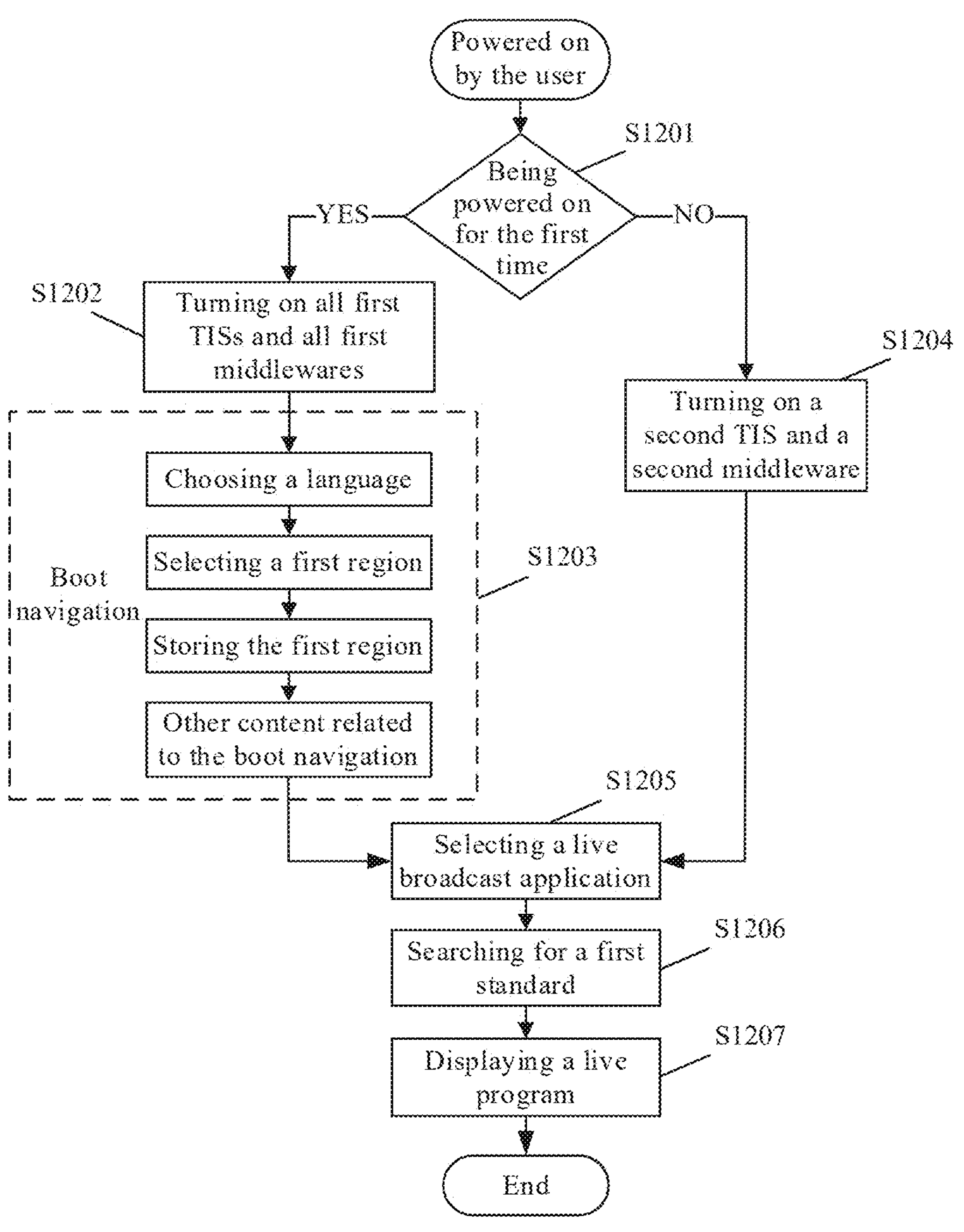
FIG. 12 is a flowchart of displaying a live program in region A by a display apparatus according to some embodiments of the disclosure.

In an implementation, the live program in region A is displayed in combination with the process shown in FIG. 12. After the user instructs the display apparatus 200 to power on, the display apparatus 200 identifies whether it is powered on for the first time.

If the display apparatus 200 recognizes that it is powered on for the first time, the display apparatus 200 turns on all the first TIS and all the first middlewares, that is, turning on the DVB TIS, PAL TIS, ATSC TIS, NTSC TIS, ISDB TIS, SECAM TIS, and DVB middleware, PAL middleware, ATSC middleware, NTSC middleware, ISDB middleware, SECAM middleware. The display apparatus 200 displays a navigation page, and the user selects the language to be used based on the navigation page. The navigation page also includes a region list (including regions of a globe), and the user selects region A based on the region list. The display apparatus 200 stores region A, and determines the second TIS and the second middleware, that is, the DVB TIS and the PAL TIS, and the DVB middleware and the PAL middleware. If the user inputs a command to select a live broadcast application to the display apparatus 200, in response to the command, the display apparatus 200 will search for a live program of the first standard corresponding to region A through the DVB TIS and PAL TIS, as well as the DVB middleware and PAL middleware, that is, a live program corresponding to DVB+PAL is searched, and the live program is displayed for the user to watch.

If the display apparatus 200 recognizes that it is not being powered on for the first time, the display apparatus 200 first obtains the stored first region, that is, region A. The display apparatus 200 only turns on the second TIS and the second middleware corresponding to region A, that is, it only turns on the DVB TIS and PAL TIS, as well as the DVB middleware and the PAL middleware, and does not turn on the ATSC TIS, NTSC TIS, ISDB TIS, SECAM TIS, as well as the ATSC middleware, NTSC middleware, ISDB middleware, and SECAM middleware. If the user inputs a command to select a live broadcast application to the display apparatus 200, in response to the command, the display apparatus 200 will search for the live program of the first standard corresponding to region A through the DVB TIS and PAL TIS, as well as the DVB middleware and the PAL middleware, that is, a live program corresponding to DVB+PAL is searched, and the live program is displayed for the user to watch.

Figure 13:
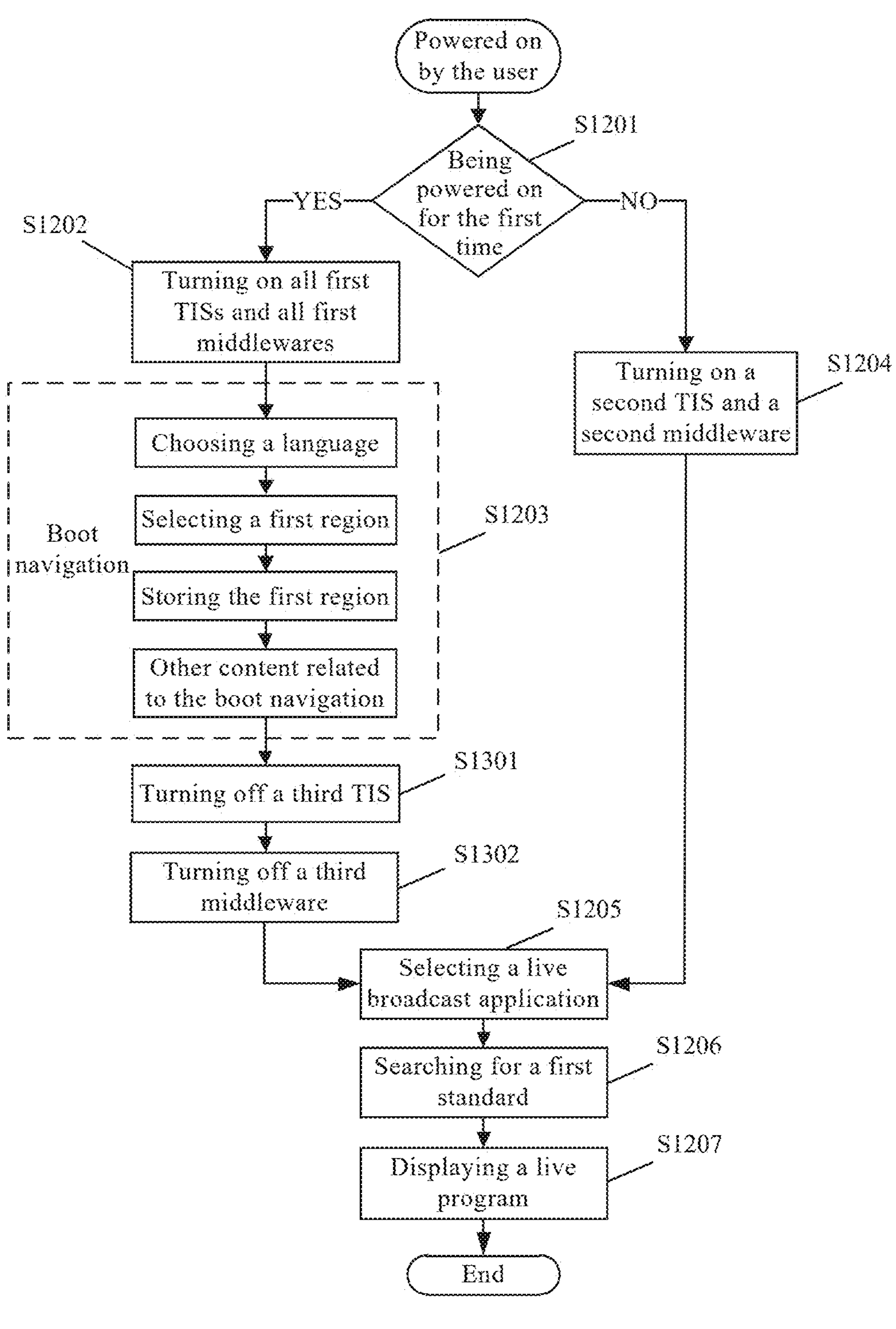
FIG. 13 is a flowchart of displaying a live program in region A by a display apparatus according to some embodiments of the disclosure.

In an implementation, the live program of region A is displayed in combination with the process shown in FIG. 13. The difference between the process shown in FIG. 13 and the process shown in FIG. 12 is that, for the process of the display apparatus 200 being powered on for the first time, after determining the second TIS and the second middleware, the display apparatus 200 also turns off the third TIS and the third middleware, that is, the ATSC TIS, NTSC TIS, ISDB TIS, SECAM TIS, and the ATSC middleware, NTSC middleware, ISDB middleware, and SECAM middleware are turned off. The remaining steps can refer to the description of the process shown in FIG. 12.

S1201, After the display apparatus is powered on by the user, determining whether the display apparatus is powered on for the first time; if the display apparatus is powered on for the first time, S1202 is executed; if the display apparatus is not powered on for the first time, S1204 is executed.

S1202, Turning on all first TISs and all first middlewares.

S1203, boot navigation, including:

choosing a language;

selecting a first region;

storing the first region;

other content related to the boot navigation.

S1204, Turning on a second TIS and a second middleware.

S1205, Selecting a live broadcast application.

S1206, Searching for a first standard.

S1207, Displaying a live program.

Compared with the process shown in FIG. 12, the process shown in FIG. 13 adds the following steps between S1203 and S1205:

S1301, turning off a third TIS.

S1302, turning off a third middleware.

Embodiment 2

TIF includes N first TISs and N first middlewares, and a first TIS and a corresponding first middleware run in the same process. Each first TIS provides a service supporting a standard, and services provided by the first TISs support different standards. Each first middleware provides a protocol supporting a standard, and the protocols provided by the first middlewares support different standards.

Figure 14:
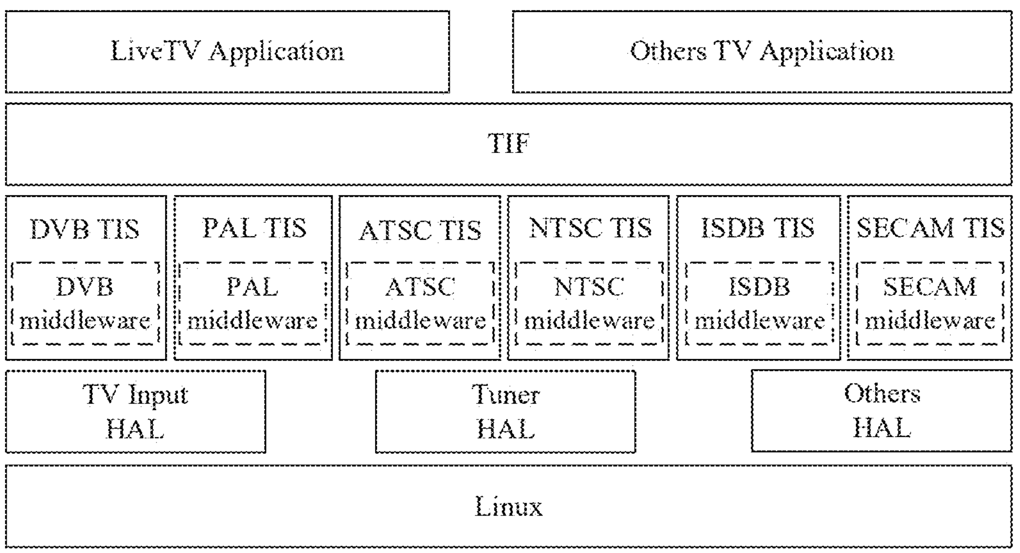
FIG. 14 is a schematic diagram of a system architecture of a display apparatus according to some embodiments of the disclosure.

Referring to a system architecture shown in FIG. 14, the system architecture includes six first TISs, namely, DVB TIS, PAL TIS, ATSC TIS, NTSC TIS, ISDB TIS, and SECAM TIS. The system architecture also includes six first middlewares, namely, DVB middleware, PAL middleware, ATSC middleware, NTSC middleware, ISDB middleware, and SECAM middleware. The first TIS and the corresponding first middleware run in the same process. Taking DVB TIS and DVB middleware as an example, DVB TIS and DVB middleware run in the same process.

Therefore, each first TIS and each first middleware has a single-standard process, that is, each first TIS and first middleware only processes the content of the standard they support, which can maintain less memory consumption and has great advantages in memory. In addition, the processing efficiency and speed are fast, the whole machine can maintain a high level of smoothness, and perform well in user response. Moreover, the first TIS can provide a better Android environment for the corresponding first middleware, which has a better effect on view display.

Taking the first region as region A, and region A supporting the first standard DVB+PAL as an example, the process of display apparatus 200 displaying live programs is similar to the description of the processes shown in FIGS. 12 and 13 in Embodiment 1, and will not be repeated here.

Embodiment 3

TIF includes N first TISs and one first middleware, and the N first TISs and the one first middleware run in different processes. Each first TIS provides a service supporting a standard, and the services provided by first TISs support different standards. The one first middleware provides protocols supporting all standards.

Figure 15:
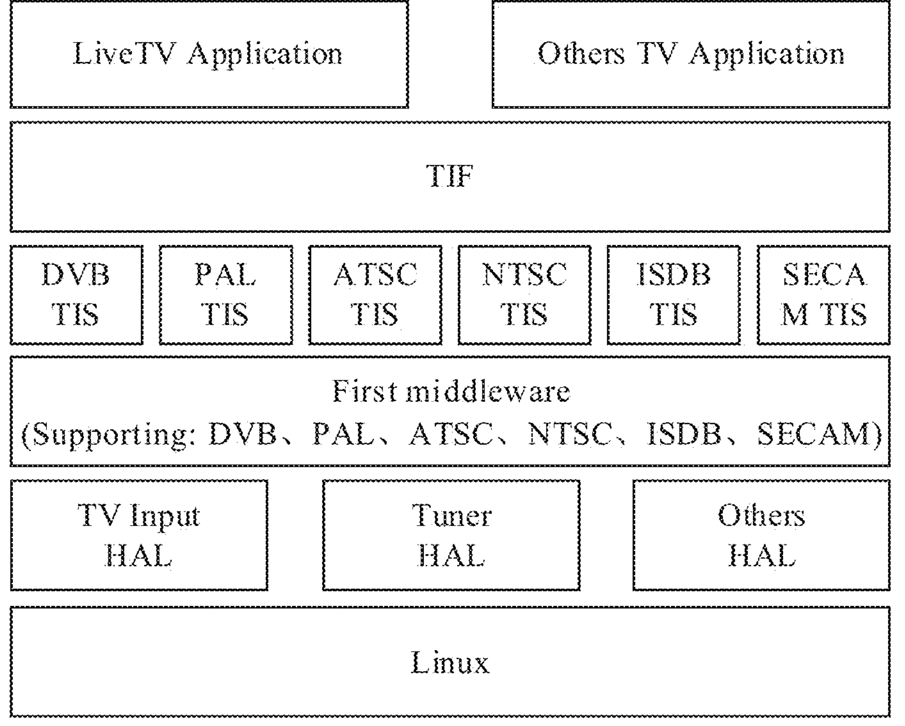
FIG. 15 is a schematic diagram of a system architecture of a display apparatus according to some embodiments of the disclosure.

Referring to a system architecture shown in FIG. 15, the system architecture includes six first TISs, namely, DVB TIS, PAL TIS, ATSC TIS, NTSC TIS, ISDB TIS, and SECAM TIS. The system architecture also includes one first middleware, which supports DVB, PAL, ATSC, NTSC, ISDB, and SECAM. The six first TISs and the one first middleware run in different processes respectively.

Therefore, each first TIS is managed in a lightweight manner, and each first TIS only processes the content of the standard it supports. Although the first middleware has a large redundancy and occupies relatively more content, the overall operation effect is better than the effect of running multiple first middlewares at the same time.

Taking the first region as region A, and region A supporting the first standard DVB+PAL as an example, the process of the display apparatus 200 displaying a live program is described.

Figure 16:
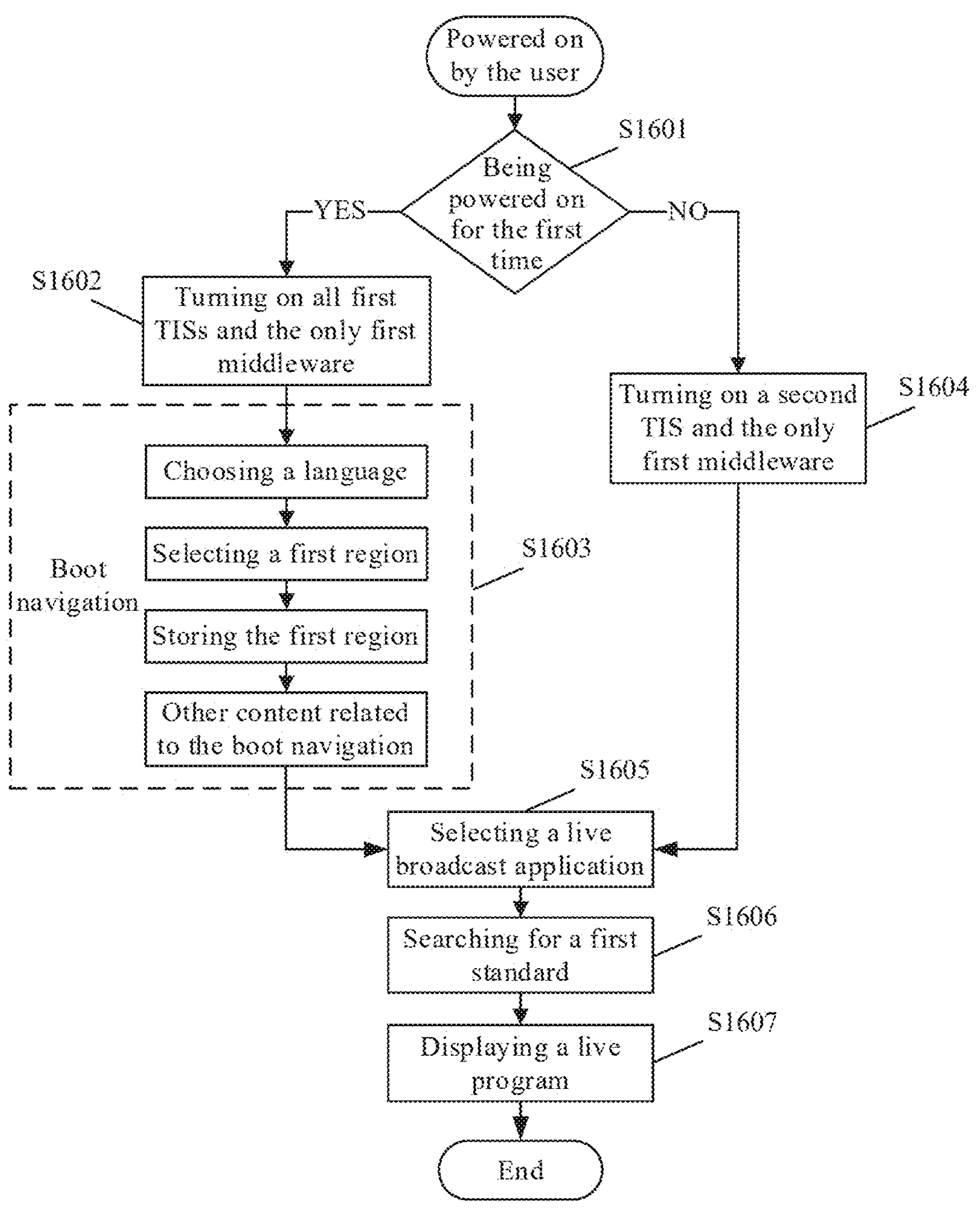
FIG. 16 is a flowchart of displaying a live program in region A by a display apparatus according to some embodiments of the disclosure.

In an implementation, the live program in region A is displayed in combination with the process shown in FIG. 16. After the user instructs the display apparatus 200 to power on, the display apparatus 200 identifies whether it is powered on for the first time.

If the display apparatus 200 recognizes that it is powered on for the first time, the display apparatus 200 turns on all the first TIS and all the first middlewares, that is, DVB TIS, PAL TIS, ATSC TIS, NTSC TIS, ISDB TIS, SECAM TIS, and the one first middleware are turned on. The display apparatus 200 displays a navigation page, and the user selects the language to be used based on the navigation page. The navigation page also includes a region list (including regions of a globe), and the user selects region A based on the region list. The display apparatus 200 stores region A, and determines the second TIS and the second middleware, that is, DVB TIS and PAL TIS, and the only first middleware. If the user inputs a command to select a live broadcast application to the display apparatus 200, in response to the command, the display apparatus 200 will search for a live program of the first standard corresponding to region A through DVB TIS and PAL TIS, and the only first middleware, that is, a live program corresponding to DVB+PAL is searched, and the live program is displayed for the user to watch.

If the display apparatus 200 recognizes that it is not being powered on for the first time, the display apparatus 200 first obtains the stored first region, that is, region A. The display apparatus 200 only turns on the second TIS and the second middleware corresponding to region A, that is, it only turns on the DVB TIS and PAL TIS, and the only first middleware, and does not start the ATSC TIS, NTSC TIS, ISDB TIS, SECAM TIS. If the user inputs a command to select a live broadcast application to the display apparatus 200, in response to the command, the display apparatus 200 will search for the live program of the first standard corresponding to region A through the DVB TIS and PAL TIS, as well as the only first middleware, that is, a live broadcast program corresponding to DVB+PAL is searched, and the live program is displayed for the user to watch.

Figure 17:
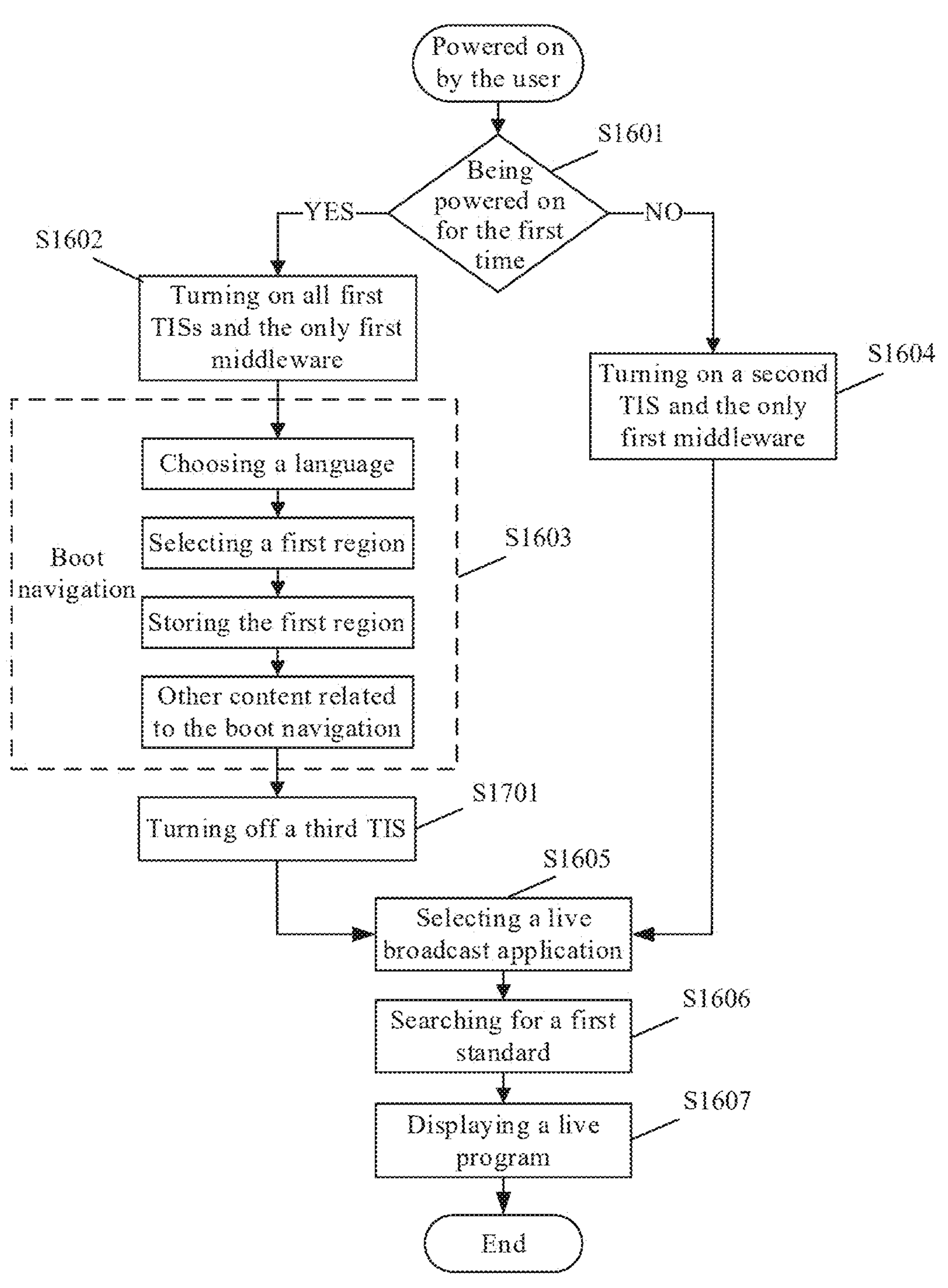
FIG. 17 is a flowchart of displaying a live program in region A by a display apparatus according to some embodiments of the disclosure.

In an implementation, the live program is displayed in region A in combination with the process shown in FIG. 17. The difference between the process shown in FIG. 17 and the process shown in FIG. 16 is that, for the process of the display apparatus 200 being powered on for the first time, after determining the second TIS and the second middleware, the display apparatus 200 also turns off the third TIS and the third middleware, that is, the ATSC TIS, NTSC TIS, ISDB TIS, and SECAM TIS are turned off. The remaining steps can refer to the description of the process shown in FIG. 16.

S1601, After the display apparatus is powered on by the user, determining whether the display apparatus is powered on for the first time; if the display apparatus is powered on for the first time, S1602 is executed; if the display apparatus is not powered on for the first time, S1604 is executed.

S1602, Turning on all first TISs and the only first middleware.

S1603, boot navigation, including:

choosing a language;

selecting a first region;

storing the first region;

other content related to the boot navigation.

S1604, Turning on a second TIS and the only first middleware.

S1605, Selecting a live broadcast application.

S1606, Searching for a first standard.

S1607, Displaying a live program.

Compared with the process shown in FIG. 16, the process shown in FIG. 17 adds the following steps between steps S1603 and S1605:

S1701, turning off a third TIS.

Embodiment 4

TIF includes one first TIS and N first middlewares, and the one first TIS and the N first middlewares run in different processes. The one first TIS provides a service that support all standards. Each first middleware provides a protocol that supports a standard, and protocols provided by the first middlewares support different standards.

Figure 18:
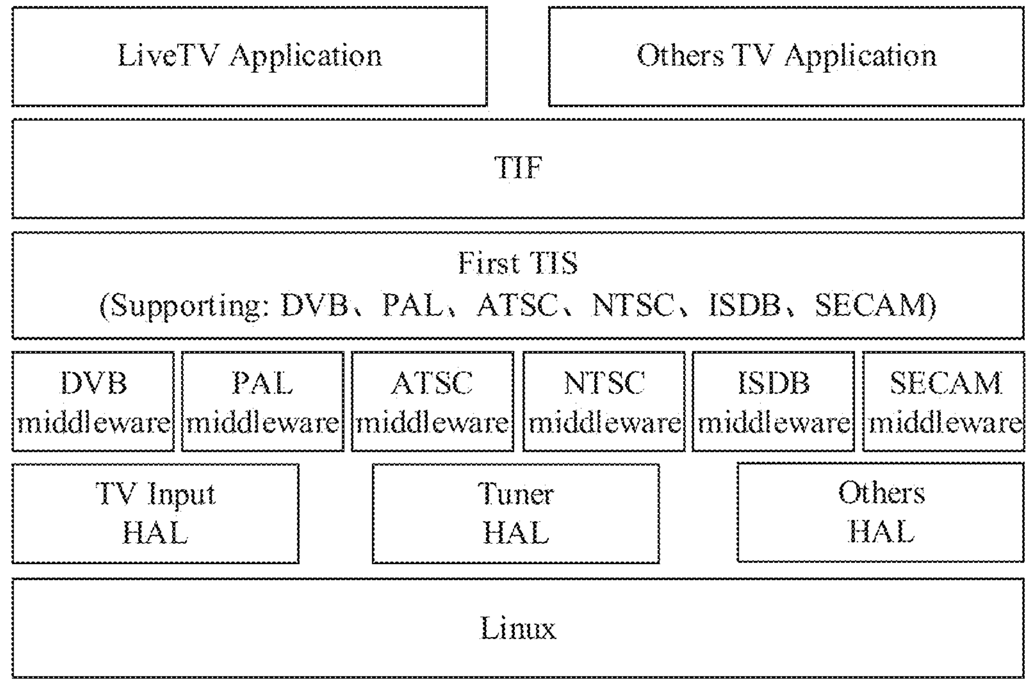
FIG. 18 is a schematic diagram of a system architecture of a display apparatus according to some embodiments of the disclosure.

Referring to the system architecture shown in FIG. 18, the system architecture includes one first TIS, and the first TIS supports DVB, PAL, ATSC, NTSC, ISDB, and SECAM. The system architecture also includes six first middlewares, namely, DVB middleware, PAL middleware, ATSC middleware, NTSC middleware, ISDB middleware, and SECAM middleware. The first TIS and the six first middlewares run in different processes, respectively.

Therefore, the first TIS only provides content that needs to support multiple standards.

Taking the first region as region A, and region A supporting the first standard DVB+PAL as an example, the process of the display apparatus 200 displaying a live program is described.

Figure 19:
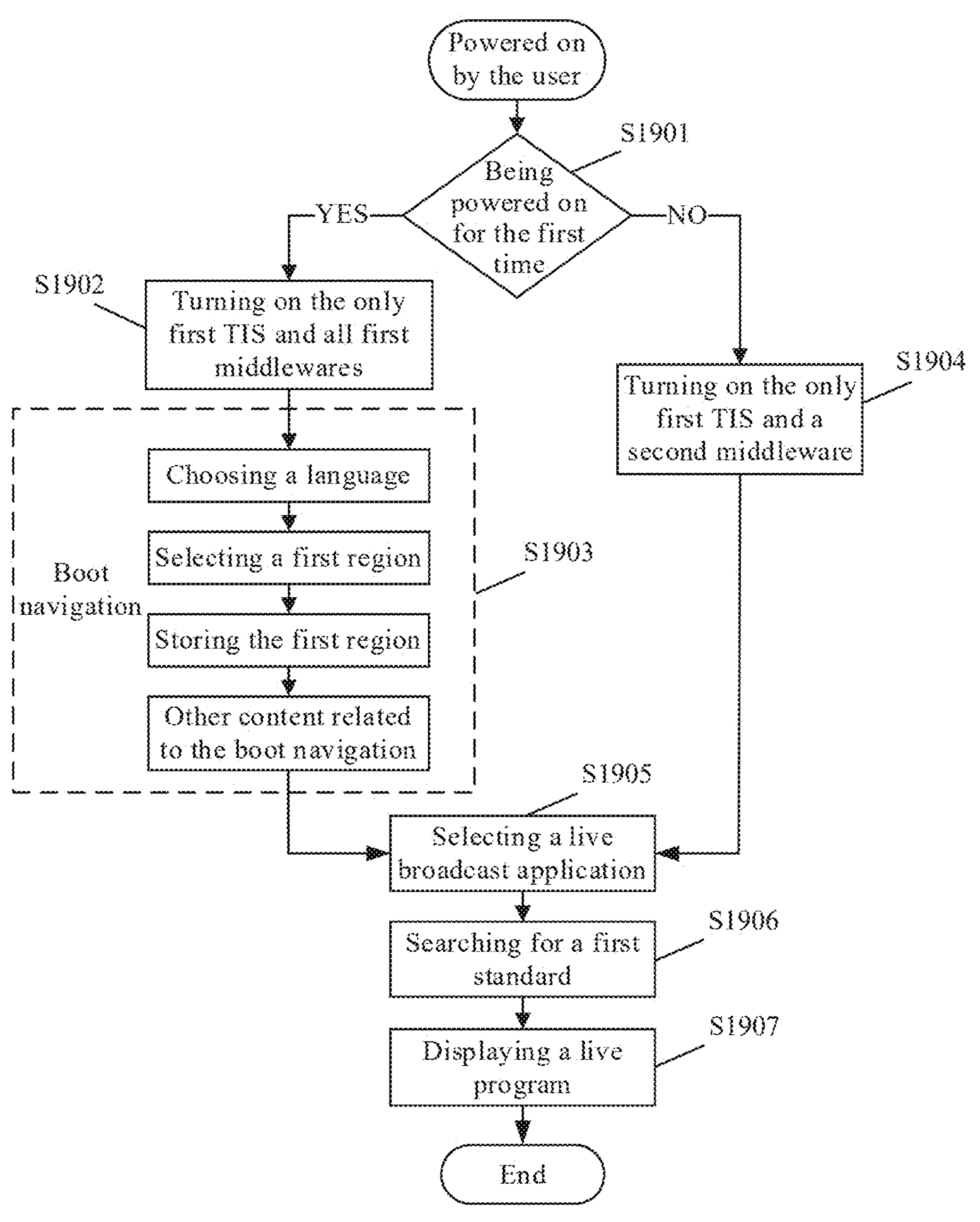
FIG. 19 is a flowchart of displaying a live program in region A by a display apparatus according to some embodiments of the disclosure.

In an implementation, the live program in region A is displayed in combination with the process shown in FIG. 19. After the user instructs the display apparatus 200 to power on, the display apparatus 200 identifies whether it is powered on for the first time.

If the display apparatus 200 recognizes that it is powered on for the first time, the display apparatus 200 turns on all the first TISs and all the first middlewares, that is, it turns on the only first TIS, as well as the DVB middleware, PAL middleware, ATSC middleware, NTSC middleware, ISDB middleware, and SECAM middleware. The display apparatus 200 displays a navigation page, and the user selects the language to be used based on the navigation page. The navigation page also includes a region list (including regions of a globe), and the user selects region A based on the region list. The display apparatus 200 stores region A, and determines the second TIS and the second middleware, that is, the only first TIS, as well as the DVB middleware and the PAL middleware. If the user inputs a command to select a live broadcast application to the display apparatus 200, in response to the command, the display apparatus 200 will search for a live program of the first standard corresponding to region A through the only first TIS, as well as the DVB middleware and the PAL middleware, that is, a live program corresponding to DVB+PAL is searched, and the live program is displayed for the user to watch.

If the display apparatus 200 recognizes that it is not being powered on for the first time, the display apparatus 200 first obtains the stored first region, that is, region A. The display apparatus 200 only turns on the second TIS and the second middleware corresponding to region A, that is, it only turns on the unique first TIS, as well as the DVB middleware and the PAL middleware, and does not turn on the ATSC middleware, the NTSC middleware, the ISDB middleware, and the SECAM middleware. If the user inputs a command to select a live broadcast application to the display apparatus 200, in response to the command, the display apparatus 200 will search for the live program of the first standard corresponding to region A through the first TIS, the DVB middleware and the PAL middleware, that is, the live program corresponding to DVB+PAL is searched, and the live program is displayed for the user to watch. In this way, targeted startup can be performed by selecting the specific second middleware to be used.

Figure 20:
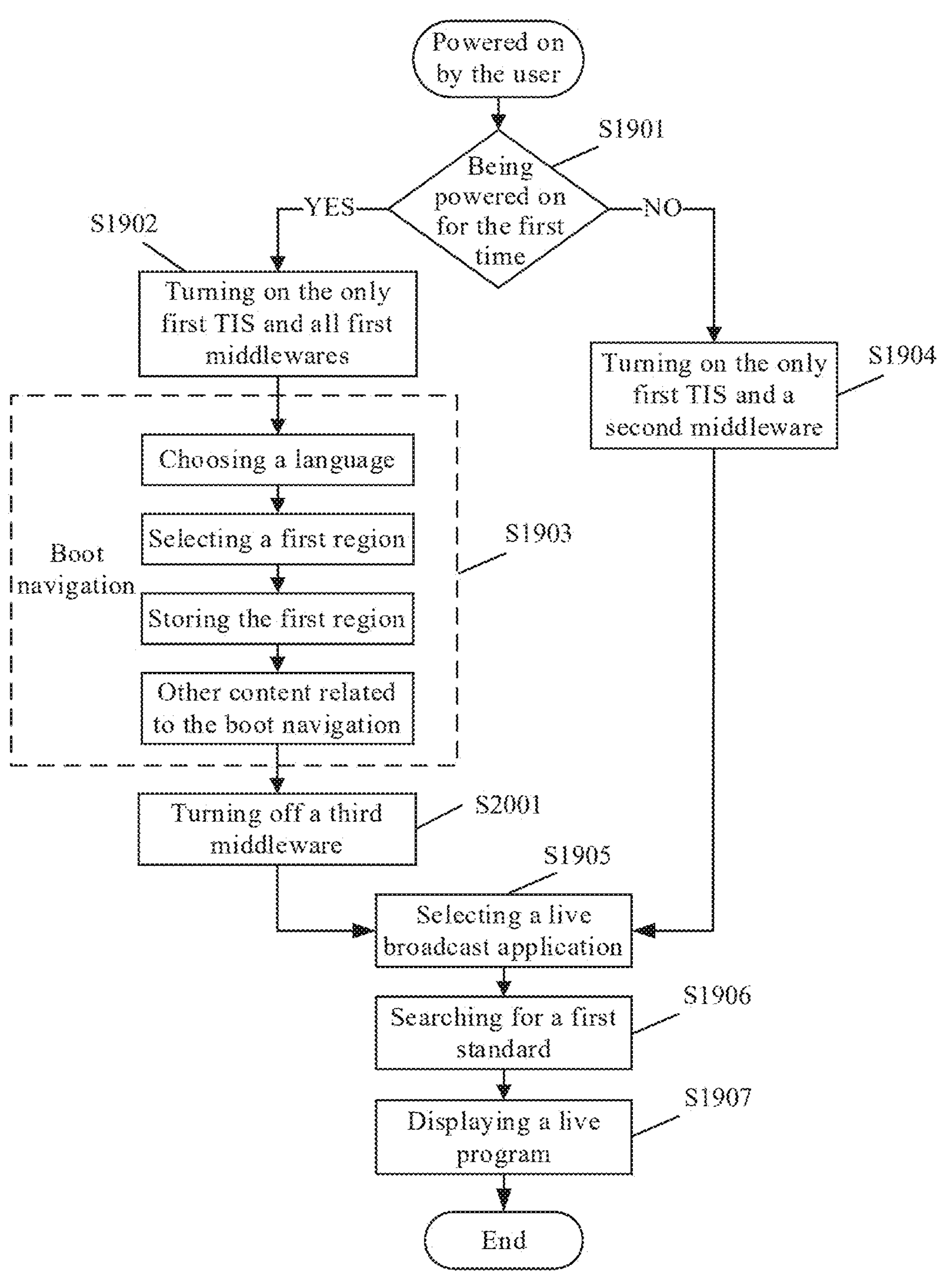
FIG. 20 is a flowchart of displaying a live program in region A by a display apparatus according to some embodiments of the disclosure.

In an implementation, the live program of region A is displayed in combination with the process shown in FIG. 20. The difference between the process shown in FIG. 20 and the process shown in FIG. 19 is that, for the process of the display apparatus 200 being powered on for the first time, after determining the second TIS and the second middleware, the display apparatus 200 also turns off the third TIS and the third middleware, that is, the ATSC middleware, NTSC middleware, ISDB middleware, and SECAM middleware are turned off. The remaining steps can refer to the description of the process shown in FIG. 19, which will not be repeated here. Therefore, it is possible to flexibly choose to turn off the unused first middleware to save content and improve the user experience.

The process shown in FIG. 19 includes following steps.

S1901, After the display apparatus is powered on by the user, determining whether the display apparatus is powered on for the first time; if the display apparatus is powered on for the first time, step S1902 is executed; if the display apparatus is not powered on for the first time, S1904 is executed.

S1902, Turning on the only first TIS and all first middlewares.

S1903, boot navigation, including:

choosing a language;

selecting a first region;

storing the first region;

other content related to the boot navigation.

S1904, Turning on the only first TIS and a second middleware.

S1905, Selecting a live broadcast application.

S1906, Searching for a first standard.

S1907, Displaying a live program.

Compared with the process shown in FIG. 19, the process shown in FIG. 20 adds the following steps between steps S1903 and S1905:

S2001, turning off the third middleware.

Embodiment 5

TIF includes one first TIS and N first middlewares, and the first TIS and the N first middlewares run in the same process. The first TIS provides a service that support all standards. Each first middleware provides a protocol that supports a standard, and protocols provided by first middlewares support different standards.

Figures 21, 22:
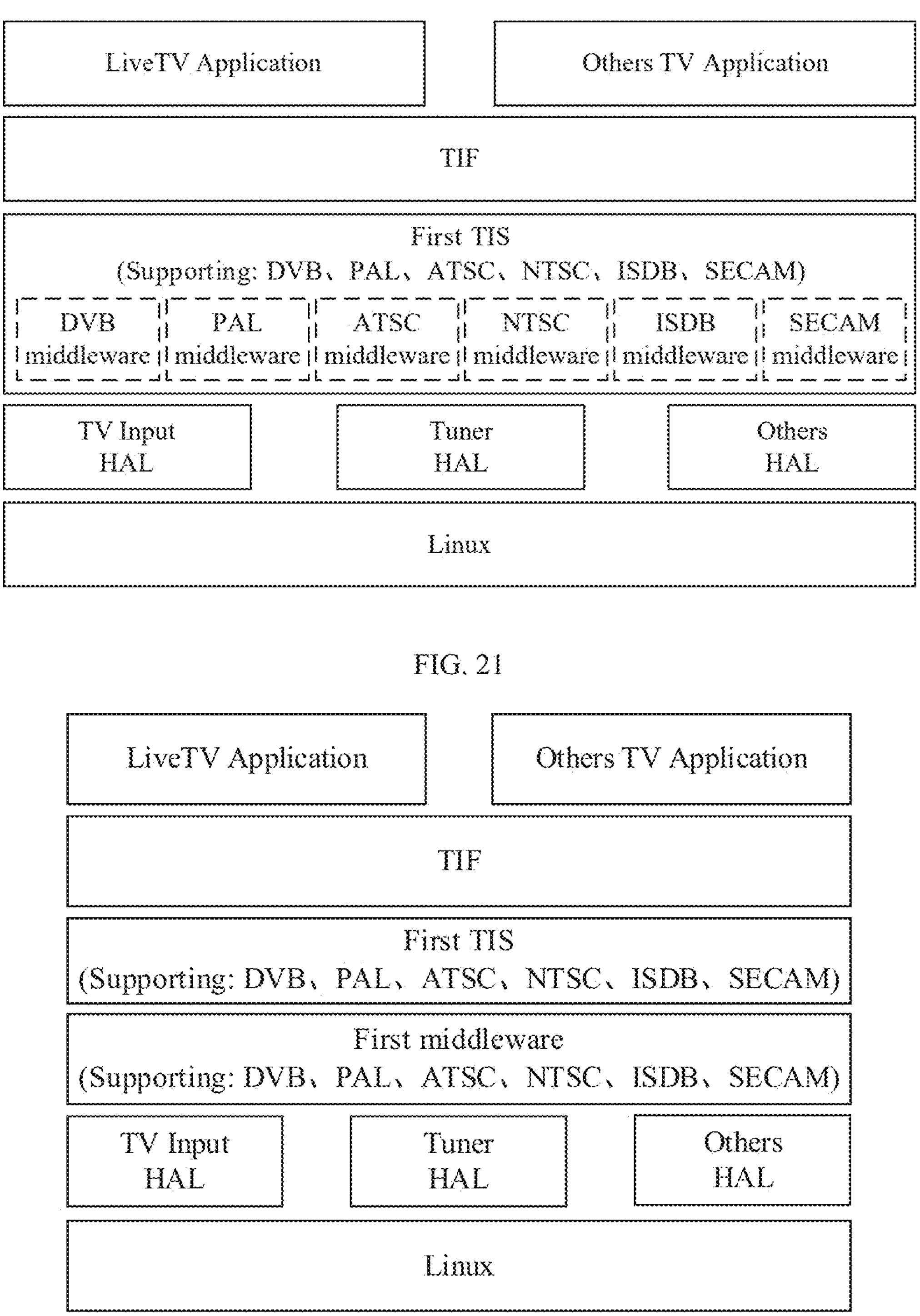
FIG. 21 is a schematic diagram of a system architecture of a display apparatus according to some embodiments of the disclosure.
FIG. 22 is a schematic diagram of a system architecture of a display apparatus according to some embodiments of the disclosure.

Referring to the system architecture shown in FIG. 21, the system architecture includes one first TIS, and the first TIS supports DVB, PAL, ATSC, NTSC, ISDB, and SECAM. The system architecture also includes six first middlewares, namely, DVB middleware, PAL middleware, ATSC middleware, NTSC middleware, ISDB middleware, and SECAM middleware. The first TIS and the six first middlewares run in the same process.

Therefore, the first TIS is integrated with the six first middlewares to facilitate switching of the standards.

Taking the first region as region A, and region A supporting the first standard DVB+PAL as an example, the process of display apparatus 200 displaying live programs is similar to the description of the processes shown in FIGS. 19 and 20 in Embodiment 4, and will not be repeated here.

Embodiment 6

The TIF includes one first TIS and one first middleware, and the first TIS and the first middleware run in different processes. The first TIS provides services supporting all standards. The first middleware provides protocols supporting all standards.

Referring to a system architecture shown in FIG. 22, the system architecture includes one first TIS, which supports DVB, PAL, ATSC, NTSC, ISDB, and SECAM. The system architecture also includes one first middleware, which supports DVB, PAL, ATSC, NTSC, ISDB, and SECAM. The first TIS and the first middleware run in different processes, respectively.

Therefore, although the memory occupancy rate of the first TIS and the first middleware is higher than that of other first TIS and first middleware that only support one standard, the memory occupancy rate is lower than the sum of the memory occupied by multiple first TIS and first middleware that only support one standard. On the whole, although the first middleware supports multiple standards at the same time and has certain requirements for the robustness and versatility of the first middleware, it is more convenient to switch standards based on the first middleware.

Taking the first region as region A, and region A supporting the first standard DVB+PAL as an example, the process of the display apparatus 200 displaying a live program is described.

Figure 23:
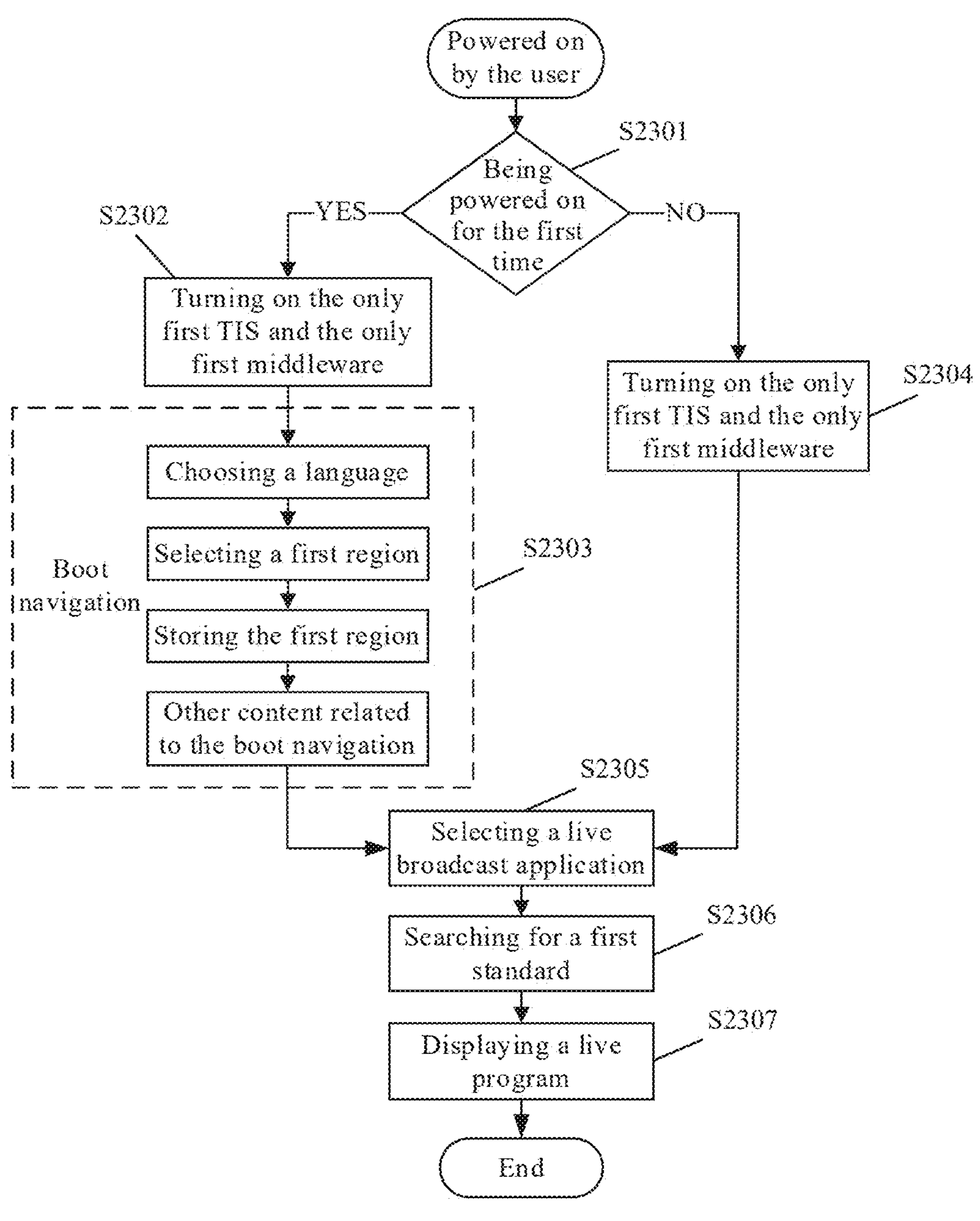
FIG. 23 is a flowchart of displaying a live program in region A by a display apparatus according to some embodiments of the disclosure.

In an implementation, the live program in region A is displayed in combination with the process shown in FIG. 23. After the user instructs the display apparatus 200 to power on, how the display apparatus 200 turns on the first TIS and the first middleware has nothing to do with whether it is powered on for the first time. In response to a power-on command, the display apparatus 200 directly turns on the only first TIS and the only first middleware. However, if the display apparatus 200 recognizes that it is powered on for the first time, the display apparatus 200 needs to perform a navigation process.

If the user inputs a command to select a live broadcast application to the display apparatus 200, in response to the command, the display apparatus 200 search for a live program of the first standard corresponding to region A through the only first TIS and the only first middleware, that is, a live program corresponding to DVB+PAL is searched, and the live program is displayed for the user to watch.

The process shown in FIG. 23 includes following steps.

S2301, After the display apparatus is powered on by the user, determining whether the display apparatus is powered on for the first time; if the display apparatus is powered on for the first time, S2302 is executed; if the display apparatus is not powered on for the first time, S2304 is executed.

S2302, Turning on the only first TIS and the only first middleware.

S2303, boot navigation, including:

choosing a language;

selecting a first region;

storing the first region;

other content related to the boot navigation.

S2304, Turning on the only first TIS and the only first middleware.

S2305, Selecting a live broadcast application.

S2306, Searching for a first standard.

S2307, Displaying a live broadcast program.

Embodiment 7

The TIF includes one first TIS and one first middleware, and the first TIS and the first middleware run in the same process. The first TIS provides a service supporting all standards. The first middleware provides a protocol supporting all standards.

Figures 24, 25:
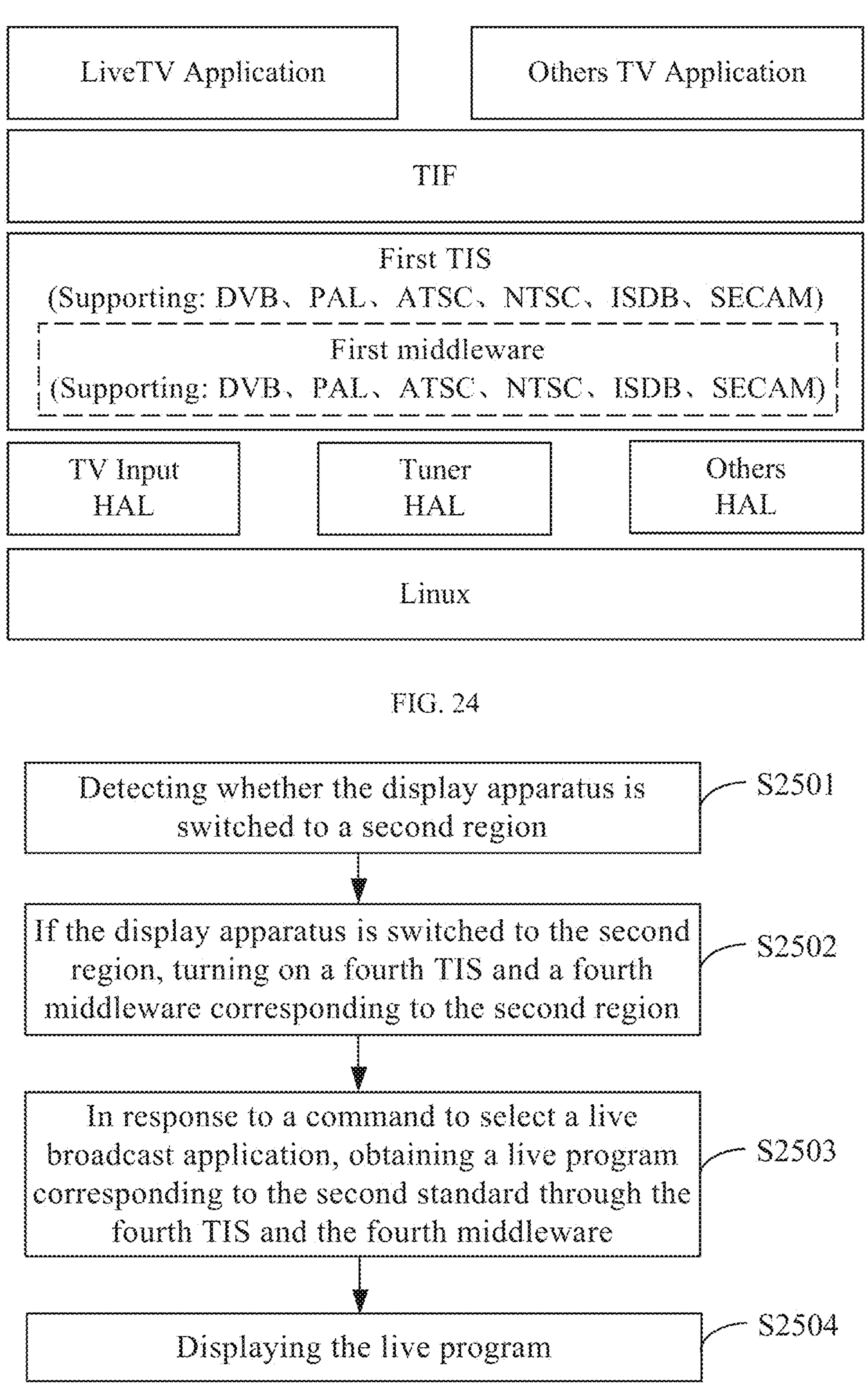
FIG. 24 is a schematic diagram of a system architecture of a display apparatus according to some embodiments of the disclosure.
FIG. 25 is a flowchart of dynamically adjusting, by a display apparatus, a standard used by the display apparatus according to some embodiments of the disclosure.

Referring to the system architecture shown in FIG. 24, the system architecture includes one first TIS, which supports DVB, PAL, ATSC, NTSC, ISDB, and SECAM. The system architecture also includes one first middleware, which supports DVB, PAL, ATSC, NTSC, ISDB, and SECAM. The first TIS and the first middleware run in the same process.

Therefore, by further integrating the first TIS and the first middleware, the content occupied by the two will be further reduced and unified, and switching of standards will be further facilitated.

Taking the first region as region A, and region A supporting the first standard DVB+PAL as an example, the process of the display apparatus 200 displaying a live program is similar to the description of the process shown in FIG. 23 in embodiment 6, and will not be repeated here.

Based on the above embodiments, the display apparatus 200 may also dynamically adjust the standard used to adapt to change in regions.

The display apparatus 200 may dynamically adjust the standard used according to the process shown in FIG. 25, and the specific steps are as follows.

S2501, Detecting whether the display apparatus is switched to a second region.

In some embodiments, the second region may be reset by the user. The process of the user setting the second region may refer to step S703 and will not be described in detail here.

In some embodiments, the display apparatus 200 may detect, through a positioning module or the like, whether the current region has changed, that is, whether it has switched from the first region to the second region.

S2502, If the display apparatus is switched to the second region, turning on a fourth TIS and a fourth middleware corresponding to the second region.

The second region supports a second standard.

The fourth TIS is a first TIS that provides a service supporting for the second standard. The fourth middleware is a first middleware that provides a protocol supporting for the second standard.

The process of the display apparatus 200 determining the fourth TIS and the fourth middleware is similar to S901-S902, which will not be described again. After determining the fourth TIS and the fourth middleware, the display apparatus 200 turns on the fourth TIS and the fourth middleware that are not turned on.

In some embodiments, if the second TIS and the second middleware that have been turned on include a fifth TIS and a fifth middleware, the fifth TIS refers to a second TIS other than the fourth TIS in the second TISs, that is, a first TIS that does not support the second standard, and the fifth middleware refers to a second middleware other than the fourth middleware in the second middlewares, that is, a first middleware that does not support the second standard, then the fifth TIS and the fifth middleware are turned off to ensure that the second standard can be used to display live programs, thereby reducing the memory consumption and resource occupation of the fifth TIS and the fifth middleware.

S2503, In response to a command to select a live broadcast application, obtaining a live program corresponding to the second standard through the fourth TIS and the fourth middleware.

After the display apparatus 200 turns on the fourth TIS and the fourth middleware, it prepares to play the live program using the second standard.

If the display apparatus 200 receives a command input from the user to select a live broadcast application, in response to the command, the display apparatus 200 will obtain a live program corresponding to the second standard through the fourth TIS and the fourth middleware. That is, the display apparatus 200 will search for the live program in the second standard.

S2504, Displaying the live program.

After searching for the live program in the second standard, the display apparatus 200 displays the live program for the user to watch.

Based on S2501-S2504, standards corresponding to regions of the globe can be switched to and used for broadcasting the live program.

Figure 26:
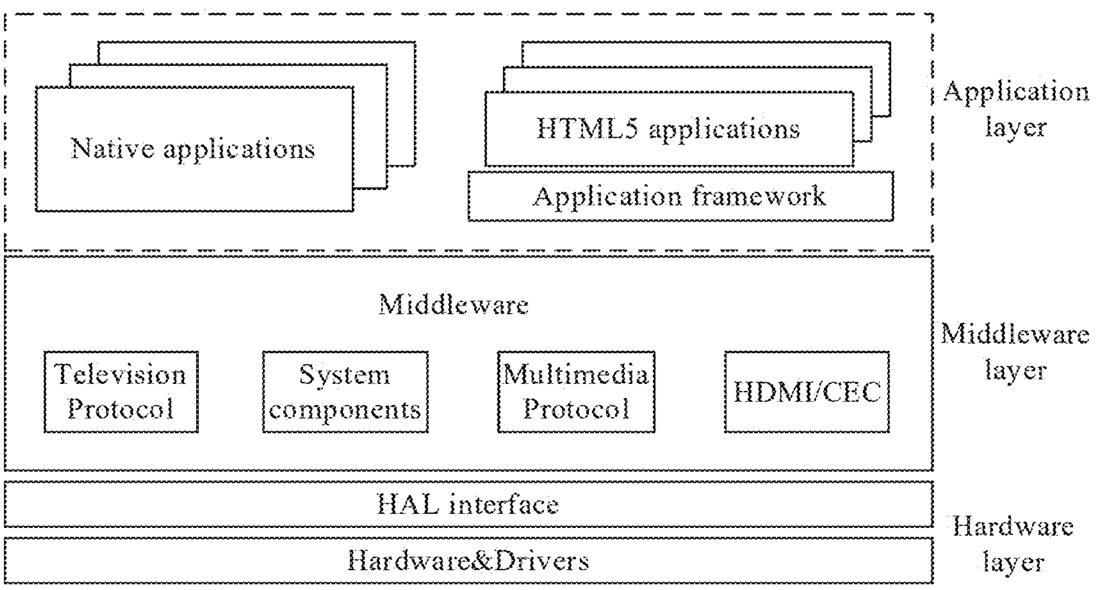
FIG. 26 is a configuration diagram of an operating system of a display apparatus according to some embodiments of the disclosure.

In some embodiments, the display apparatus 200 is based on the VIDAA software platform. As shown in FIG. 26, the operating system based on the Linux platform is divided into three layers, namely, the application layer, the middleware layer, and the hardware layer from top to bottom. Among them, the application layer includes various applications and application frameworks. The middleware layer includes various protocols and components. The hardware layer includes various interfaces, hardware, and drivers.

The criterion of television signals is referred to as a standard, which can be simply understood as a technical standard used to realize television images or sound signals. For example, the three major digital television (Digital Television, DTV) standards globally include: Advanced Standard Committee (ATSC), Digital Video Broadcasting (DVB), and Integrated Services Digital Broadcasting (ISDB). For another example, the three major analog television (Analog Television, ATV) standards globally include: Phase Alteration Line (PAL), National Television Standards Committee (NTSC), and Sequential Couleur A Memoire (SECAM). The combination of DTV standard and ATV standard is usually: DVB+PAL, ATSC+NTSC, ISDB+SECAM.

Different regions use different standards for live broadcasting, and regions can be divided by country or region. For example, region A supports broadcasting live programs in DVB+PAL, region B supports broadcasting live programs in ATSC+NTSC, and region C supports broadcasting live programs in ISDB+SECAM.

Usually, a display apparatus 200 only supports the standard of one region. Therefore, the display apparatus 200 can only play live programs of the standard it supports, that is, the display apparatus 200 can only play live programs in the region it supports. If the display apparatus 200 is moved to another region, the display apparatus 200 will not be able to support the standard of the region, that is, the user in the region will not be able to use the display apparatus to watch live programs. As a result, users can only purchase and use display apparatuses that support the standard of a corresponding region in different regions, so as to use a corresponding display apparatus in different region to watch live programs, which causes users to increase additional consumption. If a region is covered by multiple standards, or is adjacent to different standards, that is, one region supports multiple standards at the same time, if the user wants to watch the live programs of the multiple standards in the region, it is also necessary to purchase multiple display apparatuses 200 that support each standard separately, which causes users to increase additional expenses.

In order to solve the above problems, the embodiments of the disclosure provide a display apparatus, and the display apparatus may be an improvement of the display apparatus 200 or other display apparatuses shown in FIG. 1, FIG. 3 or FIG. 26. Taking the display apparatus 200 shown in FIG. 1, FIG. 3 or FIG. 26 as an example, the display apparatus 200 is configured with a first middleware.

Figure 27:
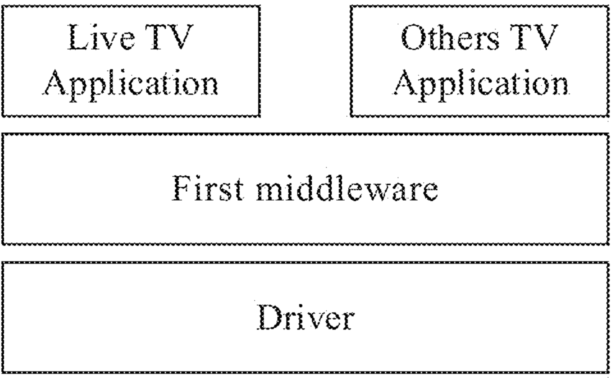
FIG. 27 is a schematic diagram of a system architecture of a display apparatus according to some embodiments of the disclosure.

The system architecture of the display apparatus 200 playing live programs is explained in conjunction with the system architecture shown in FIG. 27, which is the system architecture related to the live broadcast application involved in FIG. 26. Taking the display apparatus 200 as a TV as an example, as shown in FIG. 27, the system architecture includes live broadcast applications arranged in the application layer, namely, the live TV application (Live TV Application) and other TV applications (Others TV Application), the first middleware arranged in the middleware layer, and the driver arranged in at the hardware layer.

Among them, the first middleware provides an interface upward, which is used by the live broadcast application and is relatively private. Therefore, the live broadcast application can directly call the first middleware through the interface, and there is less redundancy between the live broadcast application and the first middleware, which can provide a smoother experience. For example, the speed of turning on the first middleware is relatively faster, and it is subject to fewer restrictions on the whole machine. The speed of the display apparatus 200 turning on navigation is faster, and the speed of AC power-on display of live programs is also faster, and the user experience is better.

The first middleware is used to provide a protocol, and the protocol provided by the first middleware corresponds to a standard, that is, the live broadcast function corresponding to the standard supported by the protocol can be realized through the protocol provided by the first middleware. For example, if the protocol provided by the first middleware supports the PAL standard, the live broadcast function corresponding to the PAL standard can be realized through the first middleware.

In the embodiments of the disclosure, a standard supported by the protocol provided by the first middleware include all standards, and the all standards include standards supported by various regions of a globe, that is, the protocol provided by the first middleware can support watching live programs in various regions of a globe.

The corresponding driver can search and recommend live programs of the standard supported by the first middleware according to the metadata.

Figure 28:
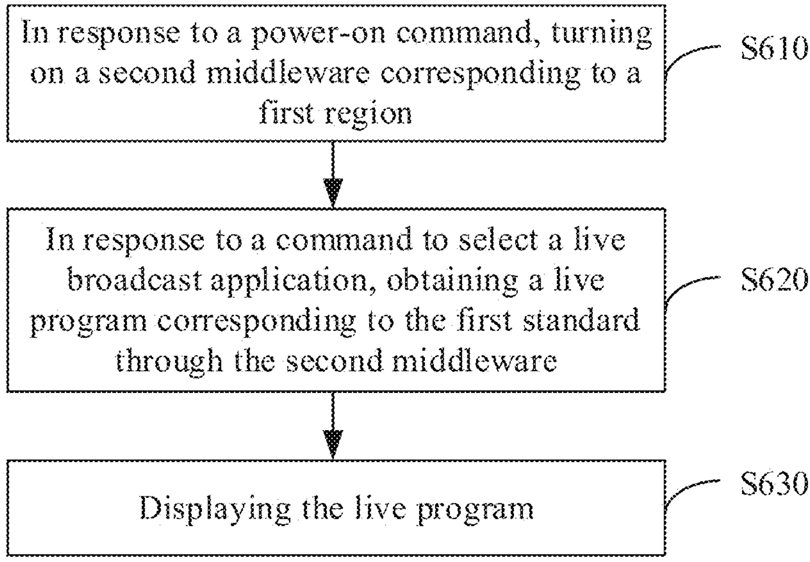
FIG. 28 is a flowchart of displaying a live program by a display apparatus according to some embodiments of the disclosure.

Based on the display apparatus 200 including the system architecture shown in FIG. 27, the embodiments of the disclosure further provides a method for displaying a live program. According to the method, the display apparatus 200 can display a live program using a standard that matches a specified region, so that users can watch live programs in any region of the world through the same display apparatus 200. The display apparatus 200 may display live programs according to the process shown in FIG. 28, and the specific steps are as follows.

S610, In response to a power-on command, turning on a second middleware corresponding to a first region.

The power-on command may be a command input from the user through a power button on the display apparatus 200, or may be a command input from the user through a power button or a standby button on the control device 100.

The first region refers to a region where the live program will be played using a corresponding standard. The first region can be the region setup by the user during a boot navigation process. The first region can be any region in the world.

The standard supported by the first region is the first standard.

The second middleware belongs to the first middleware, and a protocol provided by the second middleware supports the first standard.

Turning on the second middleware refers to powering on and starting the second middleware, that is, creating and launching a corresponding process for the second middleware, and the second middleware can provide a protocol supporting the first standard.

For different first regions, if first standards corresponding to the first regions are different, different second middlewares are turned on. Since the standards supported by the protocol provided by the first middleware include the standards corresponding to regions of a globe, the display apparatus 200 can determine a corresponding second middleware for each region of a globe, that is, one display apparatus 200 can provide a protocol of a corresponding standard for regions of a globe.

Figure 29:
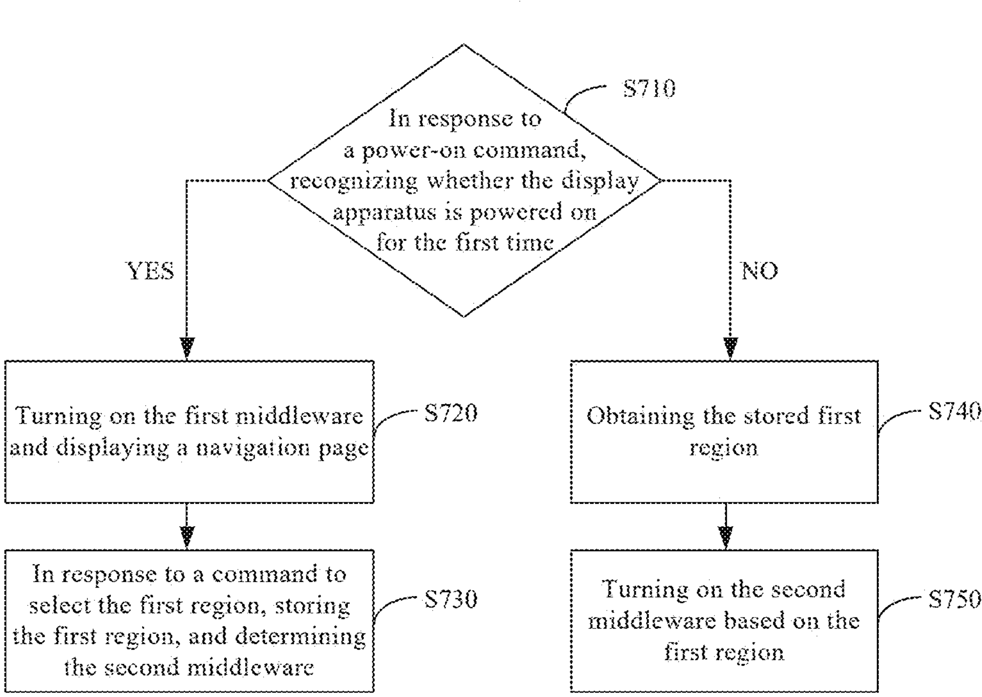
FIG. 29 is a flowchart of turning on a second middleware by a display apparatus according to some embodiments of the disclosure.

In some embodiments, the display apparatus 200 may turn on the second middleware according to the process shown in FIG. 29, and the specific steps are as follows.

S710, in response to a power-on command, recognizing whether the display apparatus is powered on for the first time.

Powered on for the first time refers to a power-on process in which the user needs to perform initial settings on relevant information of the display apparatus 200. The powered on for the first time may be a first boot after the display apparatus 200 leaves the factory, or a first boot after the display apparatus 200 is restored to factory settings. The relevant information of the display apparatus 200 may include: language, region, network, account, etc.

S720, Based on that the display apparatus is powered on for the first time, turning on the first middleware and displaying a navigation page.

If the display apparatus 200 recognizes that it is powered on for the first time, the display apparatus 200 turns on all the first middlewares.

The display apparatus 200 also displays a navigation page, which is used to guide the user to set relevant information of the display apparatus 200.

The navigation page includes a region list, which includes regions of a globe. Based on the region list, the user can select a first region, that is, a region where the display apparatus 200 is used.

Referring to the navigation page shown in FIG. 8, the navigation page includes a region list 801, which includes regions of a globe. The region list 801 may be in the form of a scrolling list or a page turning list. As shown in FIG. 8, the regions currently displayed in the region list 801 include region A, region B, region C, region D, and region E. The user may instruct the display apparatus 200 to scroll or turn the page of the region list 801 to cause the display apparatus 200 to display other regions until the user finds the first region to be used.

The navigation page may also include a language list, which includes languages around the world. The user may select a language to be used when using the display apparatus 200 based on the language list.

The navigation page may also include other navigation information corresponding to the relevant information to be set, such as a network setting list, an account setting list, etc.

S730, In response to a command to select the first region, storing the first region, and determining the second middleware.

The user sets the first region based on the region list in the navigation page.

Taking the region list 801 shown in FIG. 8 as an example, the first region to be used by the user is region A. After region A is found, the user can move a focus (shown with a gray background) to an option of region A by manipulating the control device 100 and select region A to send a command to select the first region to the display apparatus 200.

After receiving the command to select the first region, the display apparatus 200 stores the first region in response to the command, so as to use the first region as the region where the display apparatus 200 is located when using the display apparatus 200. A standard used by the display apparatus 200 when displaying the live program is determined based on the first region, that is, it determines that the display apparatus 200 uses a first standard to play the live program.

In response to the command, the display apparatus 200 further determines the second middleware. That is, the display apparatus 200 determines the second middleware that can support the first standard to prepare for the subsequent broadcast of the live program.

The display apparatus 200 may determine the second middleware according to the process shown in FIG. 30, and the specific steps are as follows.

S910, Obtaining a first correspondence relationship and a second correspondence relationship that are pre-stored.

The first correspondence relationship includes a correspondence relationship between each region in all regions and a standard supported by the region. The first correspondence relationship can be stored in the form of a mapping relationship list, a key-value combination, etc. For example, if the standard supported in region A is DVB+PAL, the first correspondence relationship can be stored as "region A-DVB+PAL".

The second correspondence relationship includes a correspondence relationship between the first middleware and the standard. The second correspondence relationship can be stored in the form of a mapping relationship list, a key-value combination, etc. Taking the first middleware including DVB middleware with the supported standard being DVB, and the first middleware including PAL middleware with the supported standard being PAL as an example. The second correspondence relationship can be stored as "DVB middleware-DVB", "PAL middleware-PAL".

S920, Determining a second middleware corresponding to the first region based on the first correspondence relationship and the second correspondence relationship.

Continuing with the above example, the display apparatus 200 can determine the first standard corresponding to the first region according to the first correspondence relationship. For example, the first region is region A, and according to the first correspondence relationship "region A-DVB+PAL", it can be determined that the first standard is DVB+PAL.

The display apparatus 200 can determine the second middleware corresponding to the first standard according to the second correspondence relationship. For example, if the first standard is DVB+PAL, according to the second correspondence "DVB middleware-DVB", "PAL middleware-PAL", it can be determined that the second middleware includes DVB middleware and PAL middleware.

Since the display apparatus 200 is in the process of being powered on for the first time, before the user sets the first region, the display apparatus 200 has not determined the first region, and thus supports the first region arbitrarily set by the user by turning on all the first middlewares. In this way, no matter which region the user indicates as the first region, the display apparatus 200 has already started the second middleware corresponding to the region in advance, that is, a preparation work for turning on the second middleware required for displaying the live program has been completed in advance. Even if the user directly chooses to enter the live broadcast application after setting the first region, the display apparatus 200 can immediately use the second middleware that has been turned on to display the live program, so as to effectively shorten the waiting time for displaying the live program.

In some embodiments, after the first region is specified, if all the first middlewares are still running, more memory consumption and resource occupation will be caused, thereby affecting the overall fluency of the display apparatus 200. In order to solve the above problem, after determining the second middleware by the display apparatus 200, the method further includes: turning off a third middleware.

The third middleware is a first middleware other than the second middleware in the first middlewares, that is, the first middleware that does not support the first standard, that is, the first middleware that will not be used when the display apparatus 200 displays a live program in the first region.

Taking an example that the first middleware includes: DVB middleware, PAL middleware, ATSC middleware supporting ATSC, and NTSC middleware supporting NTSC. If the first region is region A, the second middleware includes DVB middleware and PAL middleware. Correspondingly, the third middleware includes ATSC middleware and NTSC middleware. The display apparatus 200 may turn off the ATSC middleware and the NTSC middleware, keep the DVB middleware and the PAL middleware being turned on to ensure that the first standard can be used to display live programs, reducing the memory consumption and resource occupation of the third middleware.

S740, Based on that the display apparatus is not powered on for the first time, obtaining the stored first region.

If the display apparatus 200 recognizes that it is not being powered on for the first time, it means that the display apparatus 200 has already stored the first region, and the display apparatus 200 can directly obtain and use the first region.

The display apparatus 200 does not turn on any first middleware when recognizing that it is not being powered on for the first time and before obtaining the stored first region.

S750, Turning on the second middleware based on the first region.

The display apparatus 200 turns on the second middleware corresponding to the first region only after determining the first region, and does not turn on other first middleware. The process of turning on the second middleware is highly targeted and can avoid consuming extra resources and memory to turn on the first middleware that does not correspond to the first region.

The display apparatus 200 can turn on the second middleware according to the process shown in FIG. 31, and the specific steps are as follows.

S1010, Obtaining a first correspondence relationship and a second correspondence relationship that are pre-stored.

The first correspondence relationship includes a correspondence relationship between each region in all regions and a standard supported by the region. The second correspondence relationship includes a correspondence relationship between the first middleware and the standard.

Taking the standard supported in region A as DVB+PAL as an example, the first correspondence relationship may be stored as "region A-DVB+PAL".

Taking the example that the first middleware includes DVB middleware and the standard supported by the first middleware is DVB, and the first middleware includes PAL middleware and the standard supported by the first middleware is PAL. The second correspondence relationship may be stored as "DVB middleware-DVB", "PAL middleware-PAL".

S1020, Determining a second middleware corresponding to the first region based on the first correspondence relationship and the second correspondence relationship.

Continuing with the above example, the display apparatus 200 can determine the first standard corresponding to the first region according to the first correspondence relationship. For example, the first region is region A, and according to the first correspondence relationship "region A-DVB+PAL", it can be determined that the first standard is DVB+PAL.

The display apparatus 200 can determine the second middleware corresponding to the first standard according to the second correspondence relationship. For example, if the first standard is DVB+PAL, according to the second correspondence relationship "DVB middleware-DVB", "PAL middleware-PAL", it can be determined that the second middleware includes DVB middleware and PAL middleware.

S1030, Turning on the second middleware.

The display apparatus 200 currently does not turn on any first middleware. After determining the second middleware, the display apparatus 200 only turns on the second middleware.

Taking an example that the first middleware includes: DVB middleware, PAL middleware, ATSC middleware supporting ATSC, and NTSC middleware supporting NTSC. If the first region is region A, the second middleware includes DVB middleware and PAL middleware. Accordingly, only DVB middleware and PAL middleware are turned on, ATSC middleware and NTSC middleware are not turned on. Thus, while ensuring that the first standard can be used to display live programs, the memory consumption and resource occupation of the unnecessary first middleware are reduced.

S620, In response to a command to select a live broadcast application, obtaining a live program corresponding to the first standard through the second middleware.

After the display apparatus 200 turns on the second middleware, it prepares to play the live program using the first standard.

If the display apparatus 200 receives a command input from the user to select a live broadcast application, in response to the command, the display apparatus 200 will obtain a live program corresponding to the first standard through the second middleware. That is, the display apparatus 200 will search for a live program of the first standard.

S630, Displaying the live program.

After searching for the live program of the first standard, the display apparatus 200 displays the live program for the user to watch.

The first middleware can be configured differently as follows.

In some embodiments, the quantity of first middlewares may be N, where N is a positive integer greater than 1. A protocol provided by each first middleware supports a standard, and the standards supported by protocols provided by different first middlewares are different. The standards supported by the N protocols provided by the N first middlewares include all standards. Thus, each first middleware can process the content of the corresponding standard in a targeted manner, and each first middleware has better independence and higher processing efficiency.

In some embodiments, the number of the first middleware may be one, and protocols supporting all standards are provided by the one first middleware. Therefore, it is more convenient to switch standards based on the one first middleware.

In combination with the following embodiments, taking the standards supported by the protocol provided by the first middleware including DVB, PAL, ATSC, NTSC, ISDB, and SECAM as an example (the standards supported by the first middleware are not limited to the above cases), the process of displaying live programs using the above-mentioned display apparatus 200 for the first middleware with different configurations is explained.

Embodiment 8

The display apparatus 200 is configured with N first middlewares, herein each first middleware provides a protocol supporting a standard, and the protocols provided by the first middlewares support different standards.

Figures 30, 31, 32:
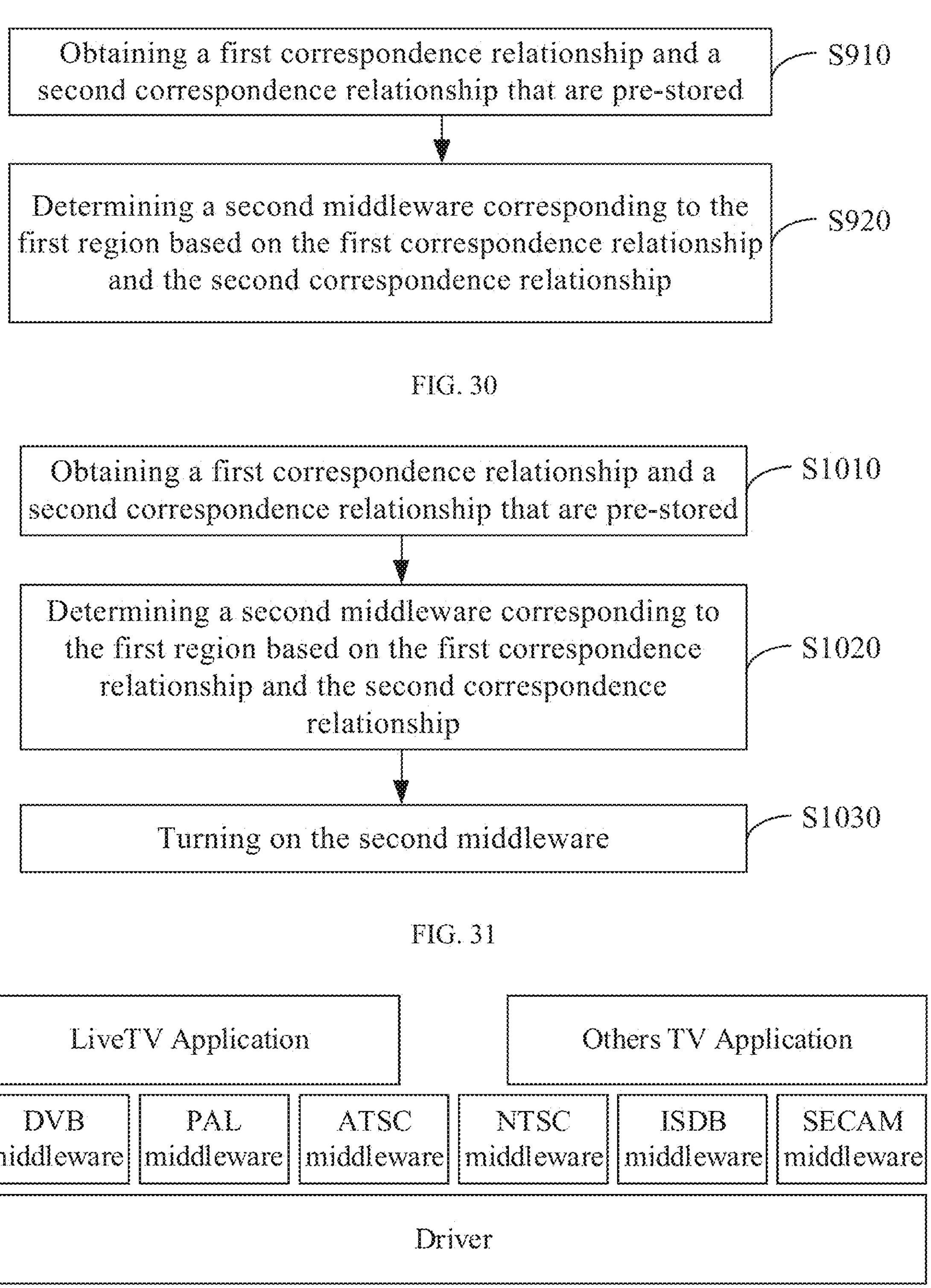
FIG. 30 is a flowchart of determining a second middleware by a display apparatus according to some embodiments of the disclosure.
FIG. 31 is a flowchart of turning on a second middleware by a display apparatus according to some embodiments of the disclosure.
FIG. 32 is a schematic diagram of a system architecture of a display apparatus according to some embodiments of the disclosure.

Referring to the system architecture shown in FIG. 32, the system architecture includes six first middlewares, namely, DVB middleware, PAL middleware, ATSC middleware, NTSC middleware, ISDB middleware, and SECAM middleware.

Therefore, each first middleware only processes the content of the standard supported by the each first middleware, which can keep less memory consumption and has great advantages in memory. In addition, the processing efficiency and speed are fast, and the whole machine can maintain a high level of smoothness and perform well in user response.

Taking the first region as region A, and region A supporting the first standard DVB+PAL as an example, the process of the display apparatus 200 displaying a live program is described.

Figure 33:
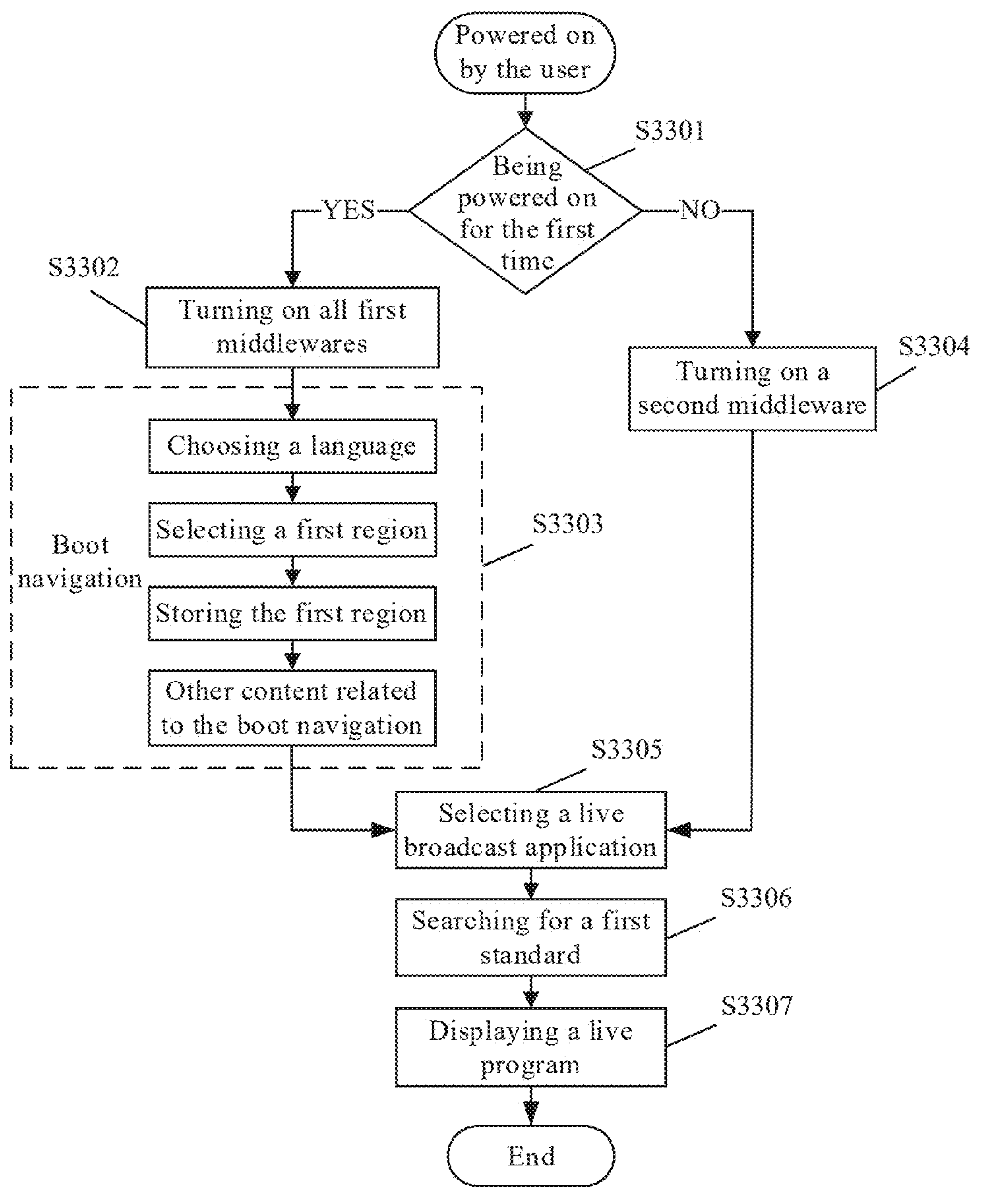
FIG. 33 is a flowchart of displaying a live program in region A by a display apparatus according to some embodiments of the disclosure.

In an implementation, the live program in region A is displayed in combination with the process shown in FIG. 33. After the user instructs the display apparatus 200 to power on, the display apparatus 200 identifies whether it is powered on for the first time.

If the display apparatus 200 recognizes that it is powered on for the first time, the display apparatus 200 turns on all the first middlewares, that is, the DVB middleware, PAL middleware, ATSC middleware, NTSC middleware, ISDB middleware, and SECAM middleware are turned on. The display apparatus 200 displays a navigation page, and the user selects the language to be used based on the navigation page. The navigation page also includes a region list (including regions of a globe), and the user selects region A based on the region list. The display apparatus 200 stores region A and determines the second middleware, namely, the DVB middleware and the PAL middleware. If the user inputs a command to select a live broadcast application to the display apparatus 200, in response to the command, the display apparatus 200 directly calls the DVB middleware and the PAL middleware, and searches for the live program of the first standard corresponding to region A, that is, the live program corresponding to DVB+PAL is searched. After obtaining the live broadcast program, the display apparatus 200 displays the live broadcast program for the user to watch.

If the display apparatus 200 recognizes that it is not being powered on for the first time, the display apparatus 200 first obtains the stored first region, that is, region A. The display apparatus 200 only turns on the second middleware corresponding to region A, that is, it only turns on the DVB middleware and the PAL middleware, and does not turn on the ATSC middleware, the NTSC middleware, the ISDB middleware, and the SECAM middleware. As a result, the display apparatus 200 can reduce the quantity of first middleware turned on by accurately turning on the second middleware that supports the standard of the first region, thereby effectively reducing the additional occupation to the memory. If the user inputs a command to select a live broadcast application to the display apparatus 200, in response to the command, the display apparatus 200 will search for the live program of the first standard corresponding to region A through the DVB middleware and the PAL middleware, that is, the live program corresponding to DVB+PAL is searched, and the live program is displayed for the user to watch.

Figure 34:
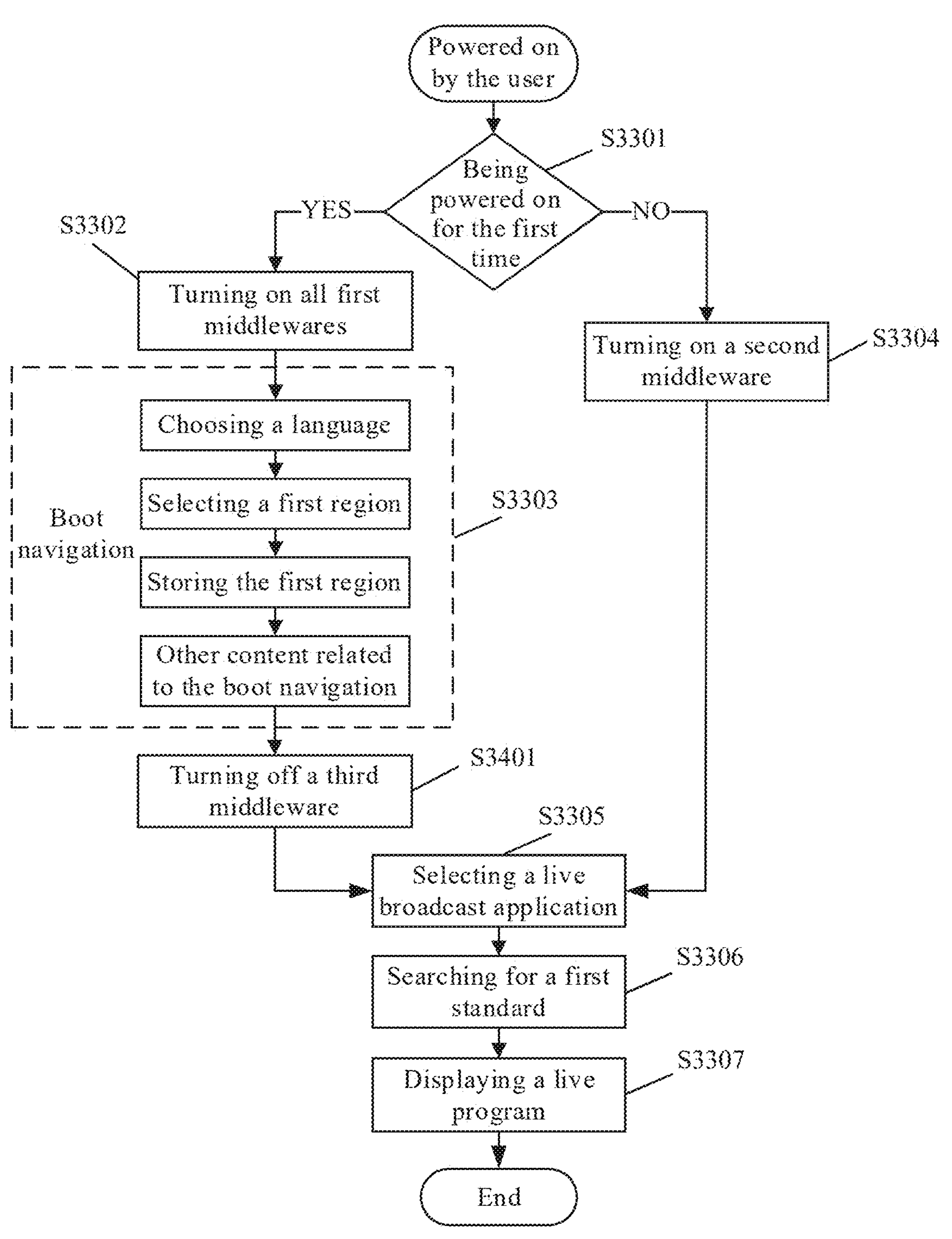
FIG. 34 is a flowchart of displaying a live program in region A by a display apparatus according to some embodiments of the disclosure.

In an implementation, the live program of region A is displayed in combination with the process shown in FIG. 34. The difference between the process shown in FIG. 34 and the process shown in FIG. 33 is that, for the process of the display apparatus 200 being powered on for the first time, after determining the second middleware, the display apparatus 200 also turns off the third middleware, that is, turns off the ATSC middleware, NTSC middleware, ISDB middleware, and SECAM middleware. The remaining steps can refer to the description of the process shown in FIG. 33. Therefore, by turning off the third middleware that does not correspond to a standard supported by the first region, the quantity of first middleware that is turned on can be effectively reduced, thereby effectively reducing the additional occupation to the memory.

The process shown in FIG. 33 includes following steps.

S3301, After display apparatus is powered on by the user, determining whether the display apparatus is powered on for the first time; if the display apparatus is powered on for the first time, S3302 is executed; if the display apparatus is not powered on for the first time, S3304 is executed.

S3302, Turning on all first middlewares.

S3303, boot navigation, including:

choosing a language;

selecting a first region;

storing the first region;

other content related to the boot navigation.

S3304, Turning on a second middleware.

S3305, Selecting a live broadcast application.

S3306, Searching for the first standard.

S3307, Displaying a live program.

Compared with the process shown in FIG. 33, the process shown in FIG. 34 adds the following step between S3303 and S3305:

S3401, turning off a third middleware.

Embodiment 9

The display apparatus 200 is configured with one first middleware, which provides protocols supporting all standards.

Figure 35:
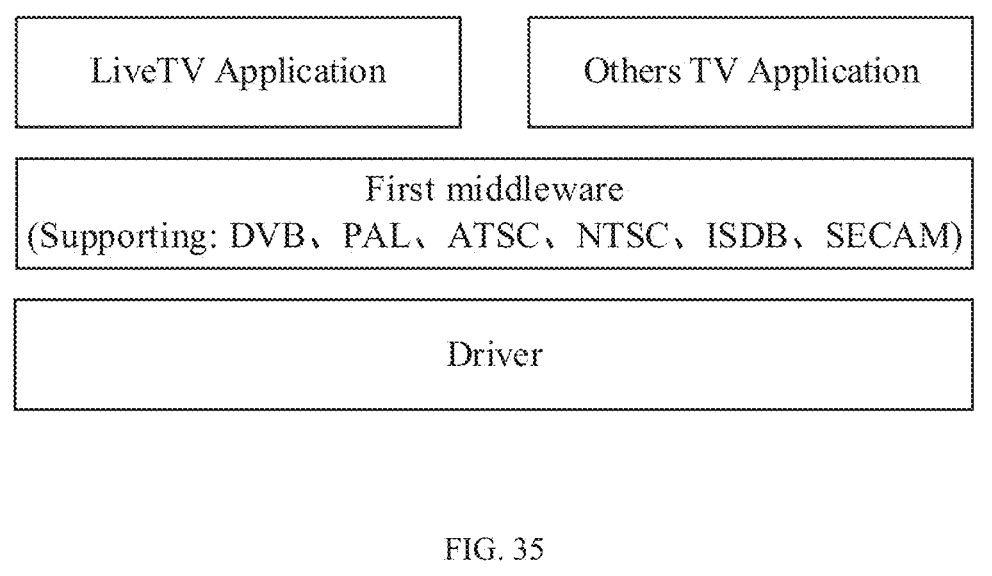

Referring to a system architecture shown in FIG. 35, the system architecture includes a first middleware that supports DVB, PAL, ATSC, NTSC, ISDB, and SECAM.

Compared with the total memory occupied by N first middlewares that only respectively support one standard, the memory occupied by one first middleware that supports all standards is smaller. The first middleware supports all standards at the same time, so the process of switching standards belongs to the internal logic of the first middleware, and switching standards is more convenient and efficient.

Taking the first region as region A, and region A supporting the first standard DVB+PAL as an example, the process of the display apparatus 200 displaying a live program is described.

Figure 36:
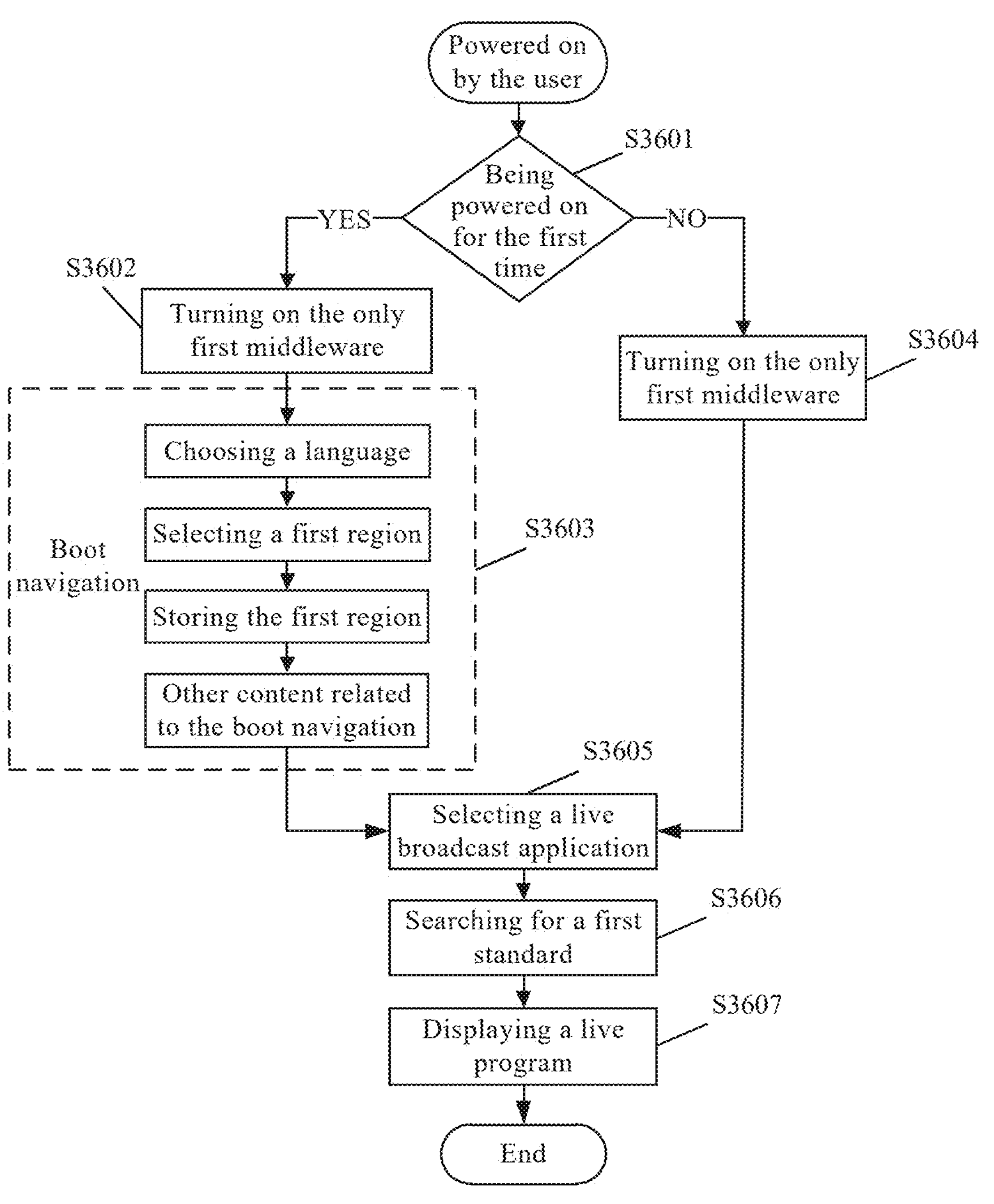
FIG. 36 is a flowchart of displaying a live program in region A by a display apparatus according to some embodiments of the disclosure.

In an implementation, the live program in region A is displayed in combination with the process shown in FIG. 36. After the user instructs the display apparatus 200 to turn on, the display apparatus 200 recognizes whether it is powered on for the first time.

If the display apparatus 200 recognizes that it is powered on for the first time, the display apparatus 200 turns on all the first middlewares, that is, the only first middleware is turned on. The display apparatus 200 displays a navigation page, and the user selects a language to be used based on the navigation page. The navigation page also includes a region list (including regions of a globe), and the user selects region A based on the region list. The display apparatus 200 stores region A and determines the second middleware, i.e., the only first middleware. Further, the display apparatus 200 determines a protocol to be used by the only middleware according to region A, that is, a protocol supporting DVB and PAL is determined. If the user inputs a command to select a live broadcast application to the display apparatus 200, the display apparatus 200 responds to the command and will search for the live broadcast program of the first standard corresponding to region A using the protocol supporting DVB and PAL through the only first middleware, that is, the live program corresponding to DVB+PAL is searched, and the live program is displayed for the user to watch.

If the display apparatus 200 recognizes that it is not powered on for the first time, the display apparatus 200 first obtains the stored first region, that is, region A. The display apparatus 200 only turns on the second middleware corresponding to region A, that is, the only first middleware is turned on. If the user inputs a command to select a live broadcast application to the display apparatus 200, the display apparatus 200 responds to the command and searches for the live program of the first standard corresponding to region A through the only first middleware. Specifically, the protocol, i.e., the protocol supporting DVB and PAL, to be used by the only first middleware is determined according to region A. The protocol supporting DVB and PAL is used to search for a live program corresponding to DVB+PAL, and the live program is displayed for users to watch.

The process shown in FIG. 36 includes following steps.

S3601, After the display apparatus is powered on by the user, determining whether it is powered on for the first time; if the display apparatus is powered on for the first time, S3602 is executed; if the display apparatus is not powered on for the first time, S3604 is executed.

S3602, Turning the only first middleware.

S3603, boot navigation, including:

choosing a language;

selecting a first region;

storing the first region;

other content related to the boot navigation.

S3604, Turning on the only first middleware.

S3605, Selecting a live broadcast application.

S3606, Searching for the first standard.

S3607, Displaying the live program.

Based on the above embodiments, the display apparatus 200 may also dynamically adjust the used standard to adapt to the change of the region.

Figure 37:
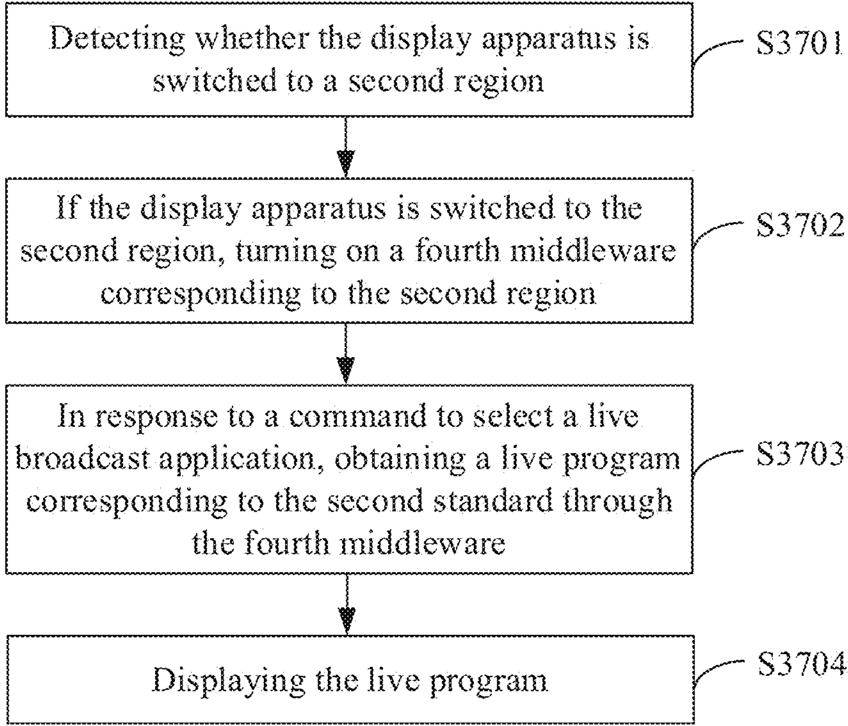
FIG. 37 is a flowchart of dynamically adjusting, by a display apparatus, a standard used by the display apparatus according to some embodiments of the disclosure.

The display apparatus 200 can dynamically adjust the standard used according to the process shown in FIG. 37, and the specific steps are as follows.

S3701, Detecting whether the display apparatus is switched to a second region.

In some embodiments, the second region may be reset by the user. The process of the user setting the second region may refer to step S730 and will not be described in detail here.

In some embodiments, the display apparatus 200 may detect, through a positioning module or the like, whether the current region has changed, that is, whether it has switched from the first region to the second region.

S3702, If the display apparatus is switched to the second region, turning on a fourth middleware corresponding to the second region.

The second region supports the second standard.

The fourth middleware is a first middleware that provides a protocol supporting for the second standard.

The process of the display apparatus 200 determining the fourth middleware is similar to steps S910-S920, which will not be described in detail herein. After determining the fourth middleware, the display apparatus 200 turns on the fourth middleware that is not turned on.

In some embodiments, if the turned on second middleware includes a fifth middleware, where the fifth middleware refers to a second middleware other than the fourth middleware in the second middleware, that is, a first middleware that does not support the second standard, then the fifth middleware is turned on to ensure that the second standard can be used to display a live program, thereby reducing the memory consumption and resource occupation of the fifth middleware.

S3703, In response to a command to select a live broadcast application, obtaining a live program corresponding to the second standard through the fourth middleware.

After the display apparatus 200 turns on the fourth middleware, it prepares to play the live program using the second standard.

If the display apparatus 200 receives a command input from the user to select a live broadcast application, the display apparatus 200 will respond to the command and obtain a live program corresponding to the second standard through the fourth middleware. That is, the display apparatus 200 will search for live broadcast programs in the second standard.

S3704, Displaying the live program.

After searching for the live program in the second standard, the display apparatus 200 displays the live program for the user to watch.

Based on steps S3701-S3704, the live program can be played by switching to the standard corresponding to each region of the globe.

For the convenience of explanation, the above description has been made in conjunction with specific embodiments. However, the above discussion in some embodiments is not intended to be exhaustive or limit the embodiments to the specific forms disclosed above. According to the above teachings, various modifications and variations can be obtained. The selection and description of the above embodiments are intended to better explain the content of this disclosure, so that those skilled in the art can better use the embodiments.

What is claimed is:

1. A display apparatus, comprising:

at least one processor, configured with a television input framework (TIF), a first television input service (TIS), and a first middleware, wherein the TIF is configured to provide an interface for a live broadcast application, the first TIS is configured to provide a service for the live broadcast application based on the TIF, standards supported by the service provided by the first TIS comprise all standards, the first middleware is configured to provide a protocol for the live broadcast application, standards supported by the protocol provided by the first middleware comprise all the standards, and all the standards comprise standards supported in regions of a globe; wherein the at least one processor is configured to execute instructions to cause the display apparatus to:

in response to a power-on command, turn on a second TIS and a second middleware corresponding to a first region, wherein the second TIS is the first TIS providing the service supporting for a first standard, the second middleware is the first middleware providing the protocol supporting for the first standard, and the first standard is a standard supported in the first region;

in response to a command to select the live broadcast application, obtain a live program corresponding to the first standard through the second TIS and the second middleware; and control a display to show the live program.

2. The display apparatus according to claim 1, wherein a number of the first TISs is one, and the first TIS provides services supporting all the standards; or a number of the first TISs is N, wherein N is a positive integer greater than 1, standards supported by services provided by the N first TISs comprise all the standards, the service provided by each of the N first TISs supports one standard, and different services provided by different first TISs support different standards.

3. The display apparatus according to claim 1, wherein a number of the first middlewares is one, and the first middleware provides protocols supporting all the standards; or a number of the first middlewares is N, wherein N is a positive integer greater than 1, standards supported by protocols provided by the N first middlewares comprise all the standards, the protocol provided by each of the first middlewares supports one standard, and protocols provided by different first middlewares support different standards.

4. The display apparatus according to claim 3, wherein the first TIS runs in the same one process as the first middleware corresponding to the first TIS.

5. The display apparatus according to claim 3, wherein the first TIS runs in a different process than the first middleware.

6. The display apparatus according to claim 4, wherein the at least one processor is further configured to execute instructions to cause the display apparatus to:

in response to the power-on command, recognize whether the display apparatus is powered on for a first time;

based on that the display apparatus is powered on for the first time, turn on the first TIS and the first middleware, and control the display to display a navigation page, wherein the navigation page comprises a region list, and the region list comprises the regions of the globe;

in response to a command to select the first region, store the first region, and determine the second TIS and the second middleware;

based on that the display apparatus is not powered on for the first time, obtain the stored first region; and turn on the second TIS and the second middleware based on the first region.

7. The display apparatus according to claim 6, wherein the at least one processor is further configured to execute instructions to cause the display apparatus to:

turn off a third TIS and a third middleware, wherein the third TIS is a first TIS other than the second TIS in the first TISs, and the third middleware is a first middleware other than the second middleware in the first middlewares.

8. The display apparatus according to claim 6, wherein the at least one processor is further configured to execute instructions to cause the display apparatus to:

obtain a first correspondence relationship and a second correspondence relationship pre-stored, wherein the first correspondence relationship comprises a correspondence relationship between each of the regions and a standard supported in each of the regions, and the second correspondence relationship comprises a correspondence relationship among the first TIS, the first middleware and the standard; and determine the second TIS and the second middleware corresponding to the first region based on the first correspondence relationship and the second correspondence relationship.

9. The display apparatus according to claim 6, wherein the at least one processor is further configured to execute instructions to cause the display apparatus to:

obtain a first correspondence relationship and a second correspondence relationship pre-stored, wherein the first correspondence relationship comprises a correspondence relationship between each of the regions and a standard supported in each of the regions, and the second correspondence relationship comprises a correspondence relationship among the first TIS, the first middleware and the standard;

determine the second TIS and the second middleware corresponding to the first region based on the first correspondence relationship and the second correspondence relationship; and turn on the second TIS and the second middleware.

10. The display apparatus according to claim 1, wherein the at least one processor is further configured to execute instructions to cause the display apparatus to:

detect whether the display apparatus is switched from the first region to a second region;

based on that the display apparatus is switched to the second region, turn on a fourth TIS and a fourth middleware corresponding to the second region;

in response to a command to select a live broadcast application, obtain a live program corresponding to a second standard through the fourth TIS and the fourth middleware;

control the display to show the live program.

11. A method for displaying a live program, performed by a display apparatus, wherein the display apparatus is configured with a television input framework (TIF), a first television input service (TIS), and a first middleware, the TIF is configured to provide an interface for a live broadcast application, the first TIS is configured to provide a service for the live broadcast application based on the TIF, standards supported by the service provided by the first TIS comprise all standards, the first middleware is configured to provide a protocol for the live broadcast application, standards supported by the protocol provided by the first middleware comprise all the standards, and all the standards comprise standards supported in regions of the globe; wherein the method comprises:

in response to a power-on command, turning on a second TIS and a second middleware corresponding to a first region, wherein the second TIS is the first TIS providing the service supporting for a first standard, the second middleware is the first middleware providing the protocol supporting for the first standard, and the first standard is a standard supported in the first region;

in response to a command to select the live broadcast application, obtaining a live program corresponding to the first standard through the second TIS and the second middleware; and displaying the live program.

12. The method according to claim 11, wherein a number of the first TISs is one, and the first TIS provides services supporting all the standards; or a number of the first TISs is N, wherein N is a positive integer greater than 1, standards supported by services provided by the N first TISs comprise all the standards, the service provided by each of the N first TISs supports one standard, and different services provided by different first TISs support different standards.

13. The method according to claim 11, wherein a number of the first middlewares is one, and the first middleware provides protocols supporting all the standards; or a number of the first middlewares is N, wherein N is a positive integer greater than 1, standards supported by protocols provided by the N first middlewares comprise all the standards, the protocol provided by each of the first middlewares supports one standard, and protocols provided by different first middlewares support different standards.

14. The method according to claim 13, wherein the first TIS runs in the same one process as the first middleware corresponding to the first TIS.

15. The method according to claim 13, wherein the first TIS runs in a different process than the first middleware.

16. The method according to claim 14, wherein the method further comprises:

in response to the power-on command, recognizing whether the display apparatus is powered on for a first time;

based on that the display apparatus is powered on for the first time, turning on the first TIS and the first middleware, and controlling the display to display a navigation page, wherein the navigation page comprises a region list, and the region list comprises the regions of the globe;

in response to a command to select the first region, storing the first region, and determining the second TIS and the second middleware;

based on that the display apparatus is not powered on for the first time, obtaining the stored first region; and turning on the second TIS and the second middleware based on the first region.

17. The method according to claim 16, wherein the method further comprises:

turning off a third TIS and a third middleware, wherein the third TIS is a first TIS other than the second TIS in the first TISs, and the third middleware is a first middleware other than the second middleware in the first middlewares.

18. The method according to claim 16, wherein the method further comprises:

obtaining a first correspondence relationship and a second correspondence relationship pre-stored, wherein the first correspondence relationship comprises a correspondence relationship between each of the regions and a standard supported in each of the regions, and the second correspondence relationship comprises a correspondence relationship among the first TIS, the first middleware and the standard; and determining the second TIS and the second middleware corresponding to the first region based on the first correspondence relationship and the second correspondence relationship.

19. The method according to claim 16, wherein the method further comprises:

obtaining a first correspondence relationship and a second correspondence relationship pre-stored, wherein the first correspondence relationship comprises a correspondence relationship between each of the regions and a standard supported in each of the regions, and the second correspondence relationship comprises a correspondence relationship among the first TIS, the first middleware and the standard;

determining the second TIS and the second middleware corresponding to the first region based on the first correspondence relationship and the second correspondence relationship; and turning on the second TIS and the second middleware.

20. The method according to claim 11, wherein the method further comprises:

detecting whether the display apparatus is switched from the first region to a second region;

based on that the display apparatus is switched to the second region, turning on a fourth TIS and a fourth middleware corresponding to the second region;

in response to a command to select a live broadcast application, obtaining a live program corresponding to a second standard through the fourth TIS and the fourth middleware;

displaying the live program.

* * * * *